(12) United States Patent  
Takahashi

(10) Patent No.: US 12,081,066 B2
(45) Date of Patent: Sep. 3, 2024

(54) ACTUATOR AND DISPLAY UNIT PROVIDED THEREWITH

(71) Applicant: FOSTER ELECTRIC COMPANY, LIMITED, Akishima (JP)

(72) Inventor: Ryo Takahashi, Akishima (JP)

(73) Assignee: FOSTER ELECTRIC COMPANY, LIMITED, Tokyo (JP)

(*) Notice: Subject to any disclaimer, the term of this patent is extended or adjusted under 35 U.S.C. 154(b) by 398 days.

(21) Appl. No.: 17/438,487

(22) PCT Filed: Mar. 6, 2020

(86) PCT No.: PCT/JP2020/009712
§ 371 (c)(1),
(2) Date: Sep. 13, 2021

(87) PCT Pub. No.: WO2020/184439
PCT Pub. Date: Sep. 17, 2020

(65) Prior Publication Data
US 2022/0149710 A1    May 12, 2022

(30) Foreign Application Priority Data
Mar. 14, 2019 (JP) ................... 2019-047331

(51) Int. Cl.
*H02K 33/16* (2006.01)
*B06B 1/04* (2006.01)
(Continued)

(52) U.S. Cl.
CPC .............. *H02K 33/16* (2013.01); *B06B 1/04* (2013.01); *G06F 3/016* (2013.01); *G06F 3/0412* (2013.01)

(58) Field of Classification Search
CPC ........ H02K 33/16; H02K 35/02; H02K 33/06; H02K 35/04
See application file for complete search history.

(56) References Cited

U.S. PATENT DOCUMENTS 7,557,474 B2 * 7/2009 Kuwabara .............. H02K 33/16
381/409
2004/0156274 A1 8/2004 Miyazawa et al.
(Continued)

FOREIGN PATENT DOCUMENTS

DE 102005046217 A1 6/2006
JP S61-045745 U 3/1986
(Continued)

OTHER PUBLICATIONS

Extended European Search Report for Application No. 20769795.4, dated Nov. 11, 2022, pp. 1-10.
(Continued)

*Primary Examiner* — Leda T Pham
(74) *Attorney, Agent, or Firm* — Thomas|Horstemeyer, LLP

(57) ABSTRACT

Provided is an actuator that lends itself to a reduction in size. An actuator S1 is provided with an elastic support body 16 including attachment member-side fixing portions 92 fixed to an attachment member 12, a movable element-side fixing portion 94 fixed to a movable element 14, and a deformable portion 80 positioned between the attachment member-side fixing portions 92 and the movable element-side fixing portion 94. Finish ends 80E of the deformable portion 80 (ends on the attachment member-side fixing portion 92 sides of the deformable portion 80) are only positioned in a region on one side in an X direction with respect to the movable element-side fixing portion 94 and a region on another side in the X direction with respect to the movable element-side fixing portion 94 (X direction outside regions).

11 Claims, 24 Drawing Sheets

(51) Int. Cl.
*G06F 3/01* (2006.01)
*G06F 3/041* (2006.01)

(56) References Cited

U.S. PATENT DOCUMENTS

| | | | |
|---|---|---|---|
| 2006/0002577 A1 | 1/2006 | Won et al. | |
| 2006/0066154 A1* | 3/2006 | Ogino | H02K 33/16 310/15 |
| 2011/0018366 A1 | 1/2011 | Choi | |
| 2013/0033128 A1* | 2/2013 | Yoon | H02K 33/18 310/25 |
| 2013/0134804 A1 | 5/2013 | Kim | |
| 2014/0103751 A1* | 4/2014 | Furukawa | H02K 35/02 310/25 |
| 2018/0301615 A1 | 10/2018 | Wang et al. | |

FOREIGN PATENT DOCUMENTS

| | | |
|---|---|---|
| JP | H08-051753 A | 2/1996 |
| JP | H09-093900 A | 4/1997 |
| JP | H11-055925 A | 2/1999 |
| JP | 2000-201396 A | 7/2000 |
| JP | 2000-333480 A | 11/2000 |
| JP | 2002336786 A | 11/2002 |
| JP | 2006-020484 A | 1/2006 |
| JP | 2006-101650 A | 4/2006 |
| JP | 2009-166016 A | 7/2009 |
| JP | 2010-279161 A | 12/2010 |
| JP | 2011-030403 A | 2/2011 |
| JP | 2011-211781 A | 10/2011 |
| JP | 2012-71215 A | 4/2012 |
| JP | 2012-217258 A | 11/2012 |
| JP | 2014-079118 A | 5/2014 |
| JP | 2015-149845 A | 8/2015 |
| WO | 2013/108404 A1 | 7/2013 |
| WO | 2018/216525 A1 | 11/2018 |

OTHER PUBLICATIONS

Japanese Office Action for Application No. 2021-505028, dated Jan. 4, 2022, pp. 1-8 (Machine Translation Included).
International Search Report and Written Opinion for WO 2020/184439 (PCT/JP2020/009712), dated May 18, 2020, pp. 1-4 (Translation Included).
Japanese Office Action for Japanese Application No. 2022-128226, dated Feb. 27, 2024, pp. 1-11 (Machine Translation Included).
Japanese Office Action for Japanese Application No. 2022-128227, dated Feb. 27, 2024, pp. 1-9 (Machine Translation Included).

* cited by examiner

ACTUATOR AND DISPLAY UNIT PROVIDED THEREWITH

CROSS-REFERENCE TO RELATED APPLICATIONS

This application is the National Stage of International Application No. PCT/JP2020/009712, filed Mar. 6, 2020, which claims priority to JP 2019-047331, filed Mar. 14, 2019, which are entirely incorporated herein by reference.

TECHNICAL FIELD

The present disclosure relates to an actuator.

BACKGROUND ART

Known actuators include those such as an actuator described in Patent Document 1.

This actuator includes an attachment member (including a yoke 1 and a case 8) configured including a coil (tubular electromagnetic coils 2, 2'), a movable element (movable element 5) configured including a magnet (permanent magnet 3), and an elastic support body (support members 7, 7') that is fixed to the attachment member and also fixed to the movable element. The elastic support body (support members 7, 7') deforms so as to allow the movable element (movable element 5) to undergo displacement in a predetermined displacement direction (x direction, y direction) relative to the attachment member.

In this actuator, a circumferential edge of the circular plate shaped elastic support body (support members 7, 7') is fixed to a tube shaped member (the yoke 1) around its entire circumference.

Patent Document

Patent Document 1: Japanese Utility Model Application Publication (JP-Y) No. S61-45745

SUMMARY OF INVENTION

Technical Problem

Actuators such as that described above are normally installed inside other devices. There are demands to reduce the size of such actuators in consideration of the installation space required for the actuator inside the device.

An object of the present disclosure is to provide an actuator that lends itself to a reduction in size.

Solution to Problem

An actuator according to a first aspect includes an attachment member including a coil, a movable element including a magnet and configured to undergo relative displacement in a predetermined displacement direction with respect to the attachment member, and an elastic support body including an attachment member-side fixed portion fixed to the attachment member, a movable element-side fixed portion fixed to the movable element, and a deformable portion positioned between the attachment member-side fixed portion and the movable element-side fixed portion. In a case in which a ±Z direction is defined as the displacement direction and an X direction and a Y direction are defined as mutually perpendicular directions in a flat plane orthogonal to the ±Z direction, and a start end is defined as an end of the deformable portion on the movable element-side fixed portion side and a finish end is defined as an end of the deformable portion on the attachment member-side fixed portion side, the finish end of the deformable portion is positioned only in a region on one side in the X direction with respect to the movable element-side fixed portion and in a region on another side in the X direction with respect to the movable element-side fixed portion.

The actuator of this aspect includes the attachment member including the coil, and the movable element including the magnet.

The actuator further includes the elastic support body. The elastic support body includes the attachment member-side fixed portion fixed to the attachment member, the movable element-side fixed portion fixed to the movable element, and the deformable portion positioned between the attachment member-side fixed portion and the movable element-side fixed portion. The deformable portion of the elastic support body undergoes deformation so as to allow the movable element to undergo relative displacement in the predetermined displacement direction (the ±Z direction) with respect to the attachment member.

Moreover, in this aspect, the finish end of the deformable portion (the end of the deformable portion on the attachment member-side fixed portion side) is positioned only in the region on the one side in the X direction with respect to the movable element-side fixed portion and the region on the other side in the X direction with respect to the movable element-side fixed portion (hereafter "X direction outside regions"), and is not positioned in a region overlapping the movable element-side fixed portion in the X direction (hereafter "X direction inside region").

This configuration enables the actuator to be reduced in size in comparison to in a configuration in which the finish end of the deformable portion is also positioned in the X direction inside region.

More specifically, in a configuration in which the finish end of the deformable portion is also positioned in the X direction inside region as well as in the X direction outside regions, the configuration of the actuator would need to be provided with a structure to fix the elastic support body within the X direction inside region. Since the elastic support body is a member that supports the movable element that undergoes displacement (for example vibrational displacement), such a structure for fixing the elastic support body would require a degree of strength. Providing such a structure would require a certain amount of space within the X direction inside region.

By contrast, in the present aspect, the finish end of the deformable portion is positioned in the X direction outside regions, and is not positioned in the X direction inside region. Such a structure to fix the elastic support body is therefore not required within the X direction inside region, with the result that the actuator lends itself to a reduction in size.

An actuator according to a second aspect is the first aspect, wherein the deformable portion includes a Y direction one-side portion that includes one of the start ends and is formed on one side in the Y direction with respect to the movable element-side fixed portion, a Y direction other-side portion that includes another of the start ends and is formed on another side in the Y direction with respect to the movable element-side fixed portion, an X direction one-side portion that includes one of the finish ends and is formed on the one side in the X direction with respect to the movable element-side fixed portion, an X direction other-side portion that includes another of the finish ends and is formed on the other side in the X direction with respect to the movable element-side fixed portion, a first arm portion joining the Y direction one-side portion and the X direction one-side portion together, a second arm portion joining the Y direction one-side portion and the X direction other-side portion together, a third arm portion joining the Y direction other-side portion and the X direction one-side portion together, and a fourth arm portion joining the Y direction other-side portion and the X direction other-side portion together.

In this aspect, the deformable portion includes the Y direction one-side portion and the Y direction other-side portion, each including the start end, and the X direction one-side portion and the X direction other-side portion, each including the finish end. The four arm portions join between these respective locations. This configuration enables a comparatively long length to be secured for the arm portions of the deformable portion, facilitates configuration of a symmetrical structure for the deformable portion in the X direction and the Y direction, and also enables rotation about X direction and Y direction axes to be suppressed. The elastic support body thus provides stable support in the displacement direction of the movable element (the ±Z direction).

Note that each of the respective arm portions may be configured by a single arm, or each of the respective arm portions may be configured by two or more arms. Moreover, the Y direction one-side portion, the Y direction other-side portion, the X direction one-side portion, and the X direction other-side portion of the deformable portion may each be formed integrally to a side portion of each adjoining arm portion (see FIG. 9), or may each have a split configuration corresponding to each of the arm portions (see, for example, FIG. 17 and FIG. 18).

An actuator according to a third aspect is the second aspect, wherein the Y direction one-side portion configures a Y direction one-side connection portion including a single start end and connected to both the first arm portion and the second arm portion, and the Y direction other-side portion configures a Y direction other-side connection portion including a single start end and connected to both the third arm portion and the fourth arm portion.

In this aspect, the Y direction one-side portion configures the Y direction one-side connection portion including a single start end and connected to both the first arm portion and the second arm portion, and the Y direction other-side portion configures the Y direction other-side connection portion including a single start end and connected to both the third arm portion and the fourth arm portion. This configuration enables an increase in the deformation amounts of the Y direction one-side portion and the Y direction other-side portion that each include a start end to be suppressed.

Namely, since the Y direction one-side portion and the Y direction other-side portion both include a start end, the deformation amounts thereof might be liable to become large deformation amounts. However, the present aspect makes it easy to secure rigidity of the Y direction one-side portion and the Y direction other-side portion, thus enabling an increase in the deformation amounts of the Y direction one-side portion and the Y direction other-side portion to be suppressed.

Moreover, the ability to secure symmetry in the Y direction enables vibration to be obtained in a consistent manner.

An actuator according to a fourth aspect is the second aspect, wherein the X direction one-side portion configures an X direction one-side connection portion including a single finish end and connected to both the first arm portion and the third arm portion, and the X direction other-side portion configures an X direction other-side connection portion including a single finish end and connected to both the second arm portion and the fourth arm portion.

In this aspect, the X direction one-side portion configures the X direction one-side connection portion including a single finish end and connected to both the first arm portion and the third arm portion, and the X direction other-side portion configures the X direction other-side connection portion including a single finish end and connected to both the second arm portion and the fourth arm portion. This configuration enables an increase in the deformation amounts of the X direction one-side portion and the X direction other-side portion that each include a finish end to be suppressed.

Moreover, the ability to secure symmetry in the X direction enables vibration to be obtained in a consistent manner.

An actuator according to a fifth aspect is the second aspect, wherein the Y direction one-side portion configures a Y direction one-side connection portion including a single start end and connected to both the first arm portion and the second arm portion, the Y direction other-side portion configures a Y direction other-side connection portion including a single start end and connected to both the third arm portion and the fourth arm portion, the X direction one-side portion configures an X direction one-side connection portion including a single finish end and connected to both the first arm portion and the third arm portion, and the X direction other-side portion configures an X direction other-side connection portion including a single finish end and connected to both the second arm portion and the fourth arm portion.

This aspect enables an increase in the deformation amounts of the Y direction one-side portion and the Y direction other-side portion that each include a start end to be suppressed, and also enables an increase in the deformation amounts of the X direction one-side portion and the X direction other-side portion that each include a finish end to be suppressed.

An actuator according to a sixth aspect is any one of the second aspect to the fifth aspect, wherein in a case in which each of the four arm portions is considered as a location extending from the start end side toward the finish end side, each of the four arm portions is configured including a return portion having an extension direction toward a Y direction inside and toward an X direction inside.

Note that the X direction inside refers to a direction approaching a center-of-gravity axis of the movable element in the X direction, and the Y direction inside refers to a direction approaching the center-of-gravity axis of the movable element in the Y direction. The center-of-gravity axis of the movable element is an axis running parallel to the Z direction, and refers to an axis running through the center of gravity of the movable element.

In this aspect, each of the four arm portions is configured including the return portion having an extension direction toward the Y direction inside and the X direction inside. This enables the length of the arm portions to be made longer without increasing the overall size of the actuator in comparison to configurations in which the arm portions are not provided with the return portions.

An actuator according to a seventh aspect is any one of the first aspect to the sixth aspect, wherein a Y direction one-side end and a Y direction other-side end of the attachment member-side fixed portion are positioned further toward the Y direction outside than the finish end.

In this aspect, the Y direction one-side end and the Y direction other-side end of the attachment member-side fixed portion are positioned further toward the Y direction outside than the finish end. Namely, the Y direction length of the attachment member-side fixed portion is extended toward both Y direction sides relative to the Y direction length of the finish end. This enables the elastic support body to be stably fixed to the attachment member.

Note that positioning the Y direction one-side end and the Y direction other-side end of the attachment member-side fixed portion further to the Y direction outside than the movable element-side fixed portion enables the elastic support body to be even more stably fixed to the attachment member.

An actuator according to an eighth aspect is any one of the first aspect to the seventh aspect, wherein the attachment member is configured including a coil fixing portion to which the coil is fixed, and a support body fixing portion to which the elastic support body is fixed, the coil fixing portion is a flat plate shaped portion with a plate thickness direction aligned with the ±Z direction, the coil is fixed to one side in the Z direction of the coil fixing portion, the support body fixing portion is provided on the one side in the Z direction with respect to the coil fixing portion such that the elastic support body is disposed on the one side in the Z direction with respect to the coil fixing portion, and the movable element is disposed on the one side in the Z direction with respect to the coil fixing portion and is fixed to a Z direction other-side of the elastic support body.

In this aspect, the respective configurations of the actuator are provided with appropriate structures and positional relationships to enable the actuator to be configured with a small size (in particular, a small size in the Z direction).

An actuator according to a ninth aspect is the eighth aspect, wherein a pair of support body fixing portions are provided on the one side in the X direction and the other side in the X direction with respect to the movable element respectively, and the actuator further includes a collapse prevention portion to prevent the pair of support body fixing portions from collapsing toward an X direction inside.

In this aspect, the actuator further includes the collapse prevention portion to prevent the pair of support body fixing portions from collapsing toward the X direction inside. This enhances the durability of the actuator.

An actuator according to a tenth aspect is any one of the first aspect to the ninth aspect, wherein the elastic support body has a structure in which a shock-absorbing member is disposed between a pair of plate springs.

In this aspect, the elastic support body has a structure in which the shock-absorbing member is disposed between the pair of plate springs in order to obtain a high vibration damping performance.

A display unit according to an eleventh aspect includes the actuator of any one of the first aspect to the tenth aspect.

In this aspect, the display unit is provided with a small actuator. Namely, the small size of actuator provided to the display unit facilitates placement of other configurations (devices, wiring, and the like) also provided to the display unit.

An actuator according to a twelfth aspect includes an attachment member configured including a coil, a movable element configured including a magnet and configured to undergo relative displacement in a predetermined displacement direction with respect to the attachment member, and an elastic support body including an attachment member-side fixed portion fixed to the attachment member, a movable element-side fixed portion fixed to the movable element, and a deformable portion positioned between the attachment member-side fixed portion and the movable element-side fixed portion, wherein the elastic support body has a structure in which a shock-absorbing member is disposed between a pair of plate springs.

In this aspect, the elastic support body has a structure in which the shock-absorbing member is disposed between the pair of plate springs, thereby obtaining an effective vibration damping performance. In particular, employing a silicone-based member as the shock-absorbing member enables the elastic support body to maintain its characteristics without being affected by the environmental temperature. A double-sided tape with a triple-layered structure configured by two silicone-based adhesive layers on either side of a silicone rubber layer is preferably employed as such a silicone-based member.

Advantageous Effects of Invention

The present disclosure is capable of obtaining an actuator that lends itself to a reduction in size.

DESCRIPTION OF EMBODIMENTS

Figure 1:
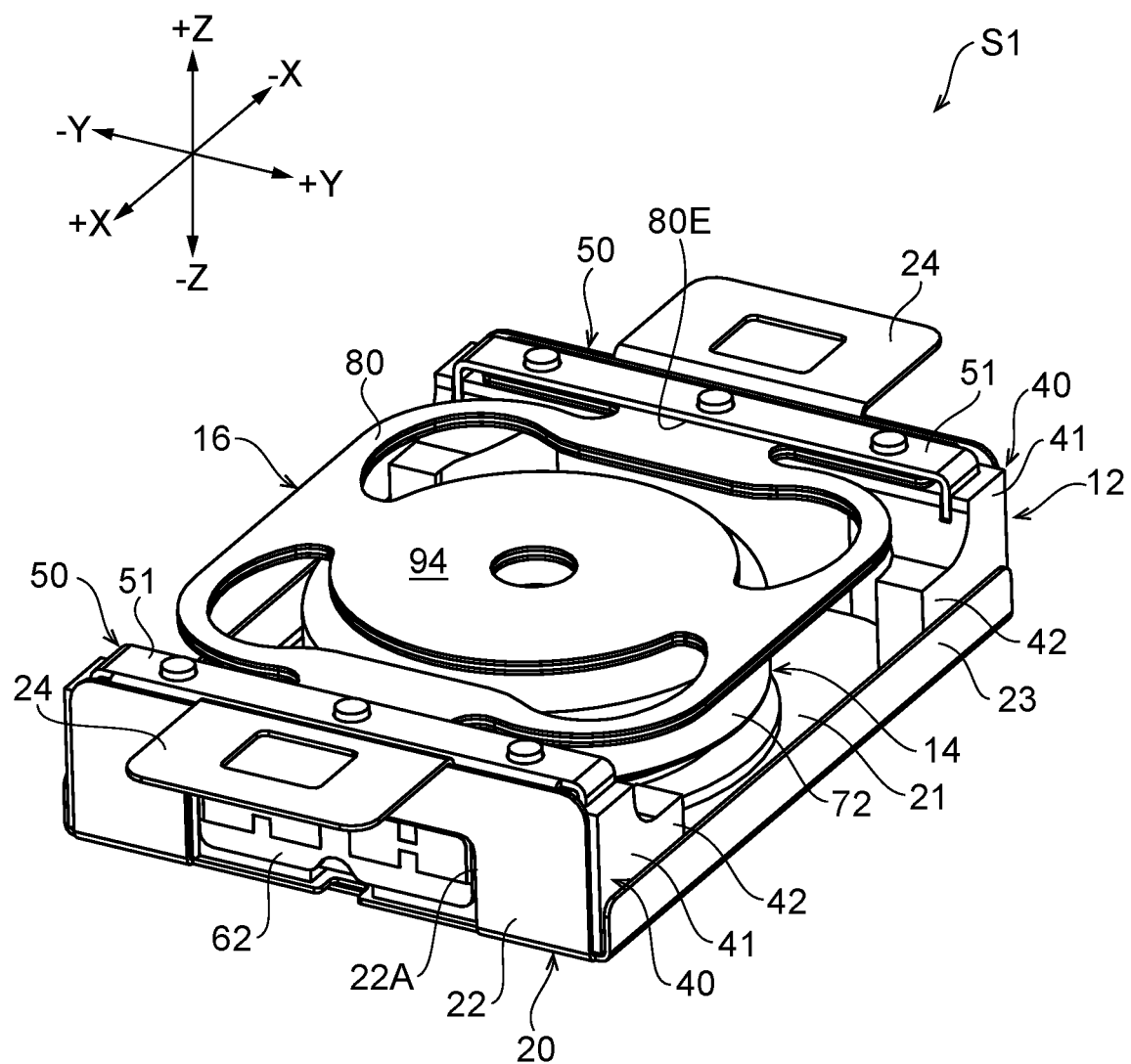
FIG. 1 is a perspective view illustrating an actuator of a first exemplary embodiment.

Throughout the following explanation, the direction labeled +Z in the respective drawings is referred to as an upward direction, and the direction labeled −Z is referred to as a downward direction. Note that this is not to be construed as a limitation to an actuator attachment direction. Explanation regarding positional relationships between respective configurations is in reference to such positional relationships when an elastic support body 16 is in a free state (the state illustrated in the respective drawings). Moreover, in the following explanation, an axis passing through the center of gravity of a movable element 14 and running parallel to the Z directions is referred to as a center-of-gravity axis AX of the movable element 14. In an X direction, a direction approaching the center-of-gravity axis AX of the movable element 14 is referred to as the X direction inside, and a direction heading away from the center-of-gravity axis AX of the movable element 14 is referred to as the X direction outside. In a Y direction, a direction approaching the center-of-gravity axis AX of the movable element 14 is referred to as the Y direction inside, and a direction heading away from the center-of-gravity axis AX of the movable element 14 is referred to as the Y direction outside. A +X direction is referred to as one side in the X direction, a −X direction is referred to as the other side in the X direction, a +Y direction is referred to as one side in the Y direction, a −Y direction is referred to as the other side in the Y direction, the +Z direction is referred to as one side in the Z direction, and the −Z direction is referred to as the other side in the Z direction. Furthermore, reference numerals may be omitted from the respective drawings in the interests of simplicity.

First Exemplary Embodiment

Explanation follows regarding an actuator S1 according to a first exemplary embodiment of the present disclosure.

Figure 10:
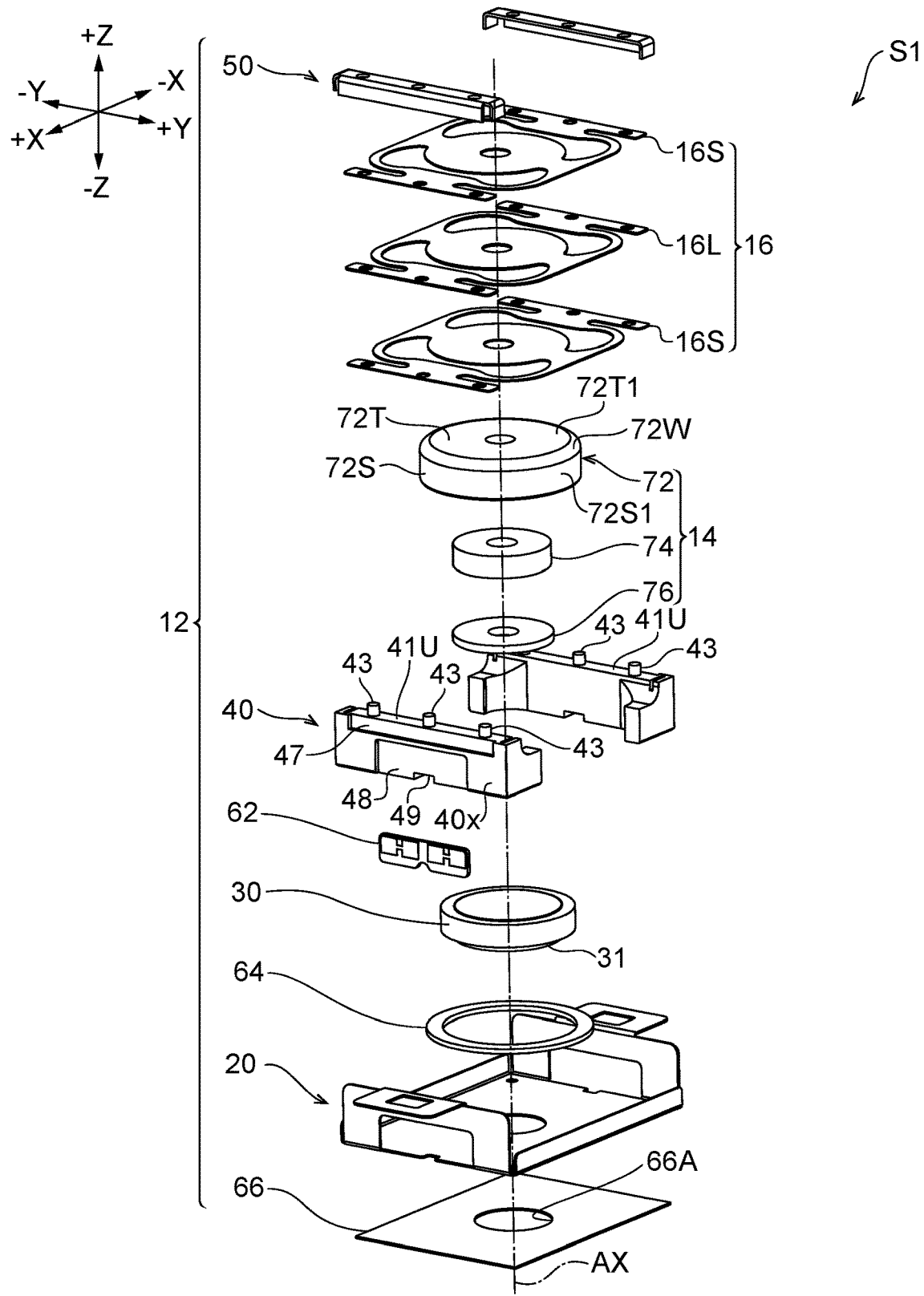
FIG. 10 is an exploded perspective view illustrating an actuator of the first exemplary embodiment.

FIG. 1 is a perspective view illustrating the actuator S1 of the first exemplary embodiment, and FIG. 10 is an exploded perspective view of the actuator S1.

The actuator S1 includes an attachment member 12, serving as an "attachment member", that is capable of being attached to a display section 102 (see FIG. 11) of a display unit 100. As illustrated in FIG. 10, the attachment member 12 is configured by covers 50, inner frames 40, a terminal 62, a coil 30, a cushioning member 64, an outer frame 20, and an adhesive sheet 66.

The actuator S1 also includes the movable element 14 that undergoes relative displacement in a predetermined displacement direction (±Z direction) with respect to the attachment member 12. The movable element 14 is configured by a yoke 72, a magnet 74, and a pole piece 76.

The actuator S1 further includes the elastic support body 16 that elastically supports the movable element 14 with respect to the attachment member 12. The elastic support body 16 includes two plate springs 16S and a shock-absorbing member 16L. The elastic support body 16 has a structure in which the shock-absorbing member 16L is interposed between the two plate springs 16S. The plate springs 16S are manufactured from metal, for example stainless steel. The shock-absorbing member 16L is a member that has a lower modulus of elasticity than the plate springs 16S. For example, the shock-absorbing member 16L is configured by double-sided tape disposed between the pair of plate springs 16S. The double-sided tape may be double-sided tape with a triple-layered structure configured by two silicone-based adhesive layers on either side of a silicone rubber layer. The shock-absorbing member 16L deforms in response to deformation of the plate springs 16S so as to absorb vibration of the movable element 14 via the plate springs 16S. Since the shock-absorbing member 16L is disposed between the pair of plate springs 16S in the elastic support body 16, the shock-absorbing member 16L is suppressed from separating from the respective plate springs 16S in response to the amplitude of the movable element 14. This enables the shock-absorbing member 16L to maintain a stable vibration damping performance, thereby enabling drive of the movable element 14 to conform smoothly to input signals.

Figure 7:
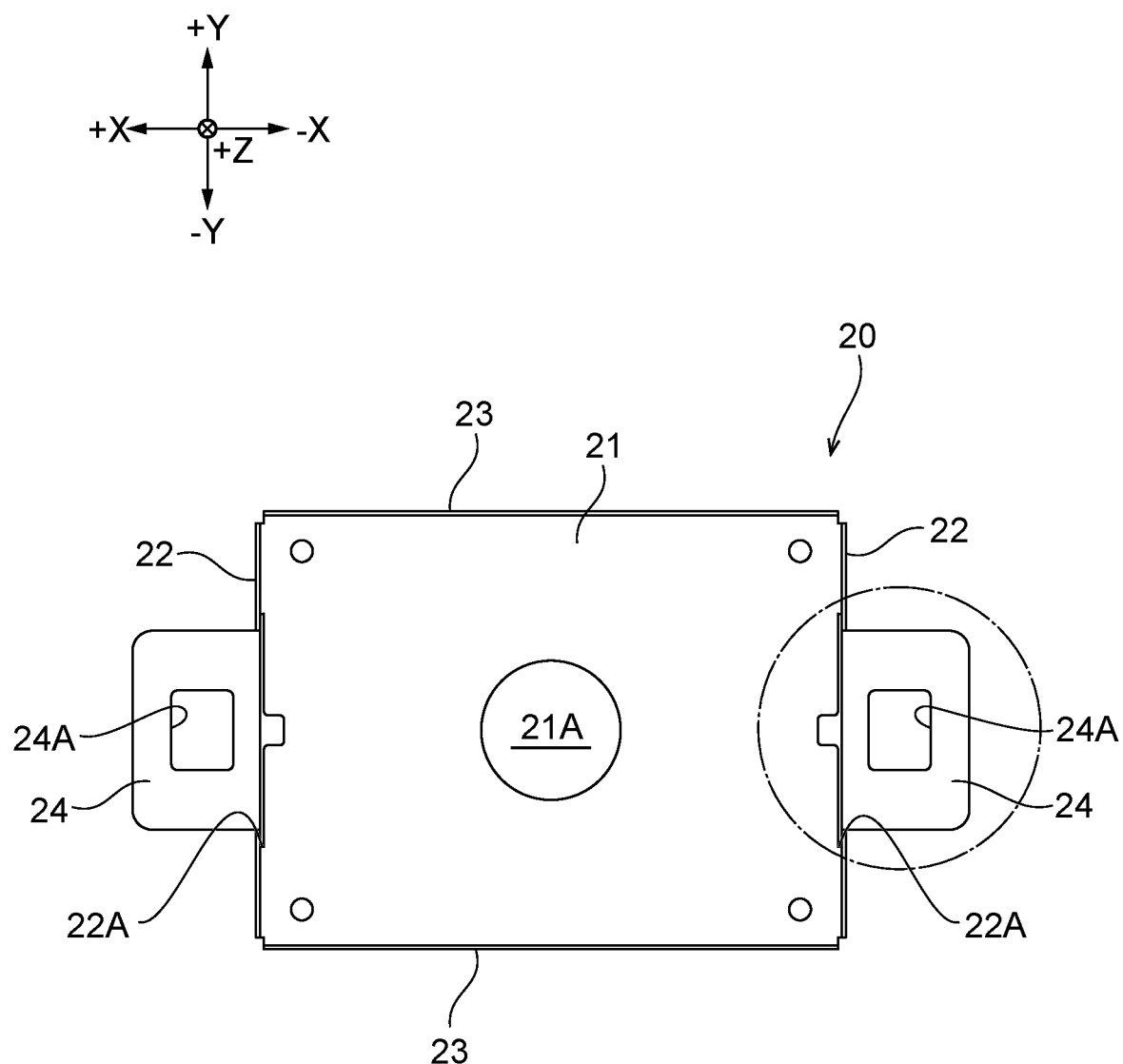
FIG. 7 is an illustration of an outer frame of the first exemplary embodiment.

FIG. 7 illustrates the outer frame 20. The outer frame 20 includes a base plate 21, a pair of first upright plates 22 formed on both X direction sides of the base plate 21, a pair of second upright plates 23 formed on both Y direction sides of the base plate 21, and a pair of attachable portions 24 formed at an upper side of the pair of first upright plates 22.

The base plate 21 is configured in a flat plate shape with a plate thickness direction aligned with the Z direction, and has a rectangular profile with its length direction in the X direction. A circular through hole 21A is formed penetrating the center of the base plate 21. Each of the first upright plates 22 is formed in a flat plate shape with a plate thickness direction aligned with the X direction, and has a rectangular profile with its length direction in the Y direction. A rectangular through hole 22A is formed penetrating a lower central portion of each of the first upright plates 22. Each of the second upright plates 23 is formed in a flat plate shape with a plate thickness direction aligned with the Y direction, and has a rectangular profile with its length direction in the X direction. A Z direction dimension of the respective second upright plates 23 is smaller than a Z direction dimension of the respective first upright plates 22, and is specifically no more than half thereof. Each of the attachable portions 24 is configured in a flat plate shape with a plate thickness direction aligned with the Z direction, and has a rectangular profile with its length direction in the Y direction. The attachable portions 24 are formed at the X direction outsides of the first upright plates 22. A rectangular attachment hole 24A is formed penetrating each of the attachable portions 24. The attachment holes 24A enable attachment to other members without using the adhesive sheet 66.

The outer frame 20 is manufactured from a single metal sheet. Bent portions (not allocated reference numerals) that are bent with respect to the plate thickness direction are thus formed between the base plate 21 and the respective first upright plates 22, between the base plate 21 and the respective second upright plates 23, and between the first upright plates 22 and the corresponding attachable portions 24.

Figure 5:
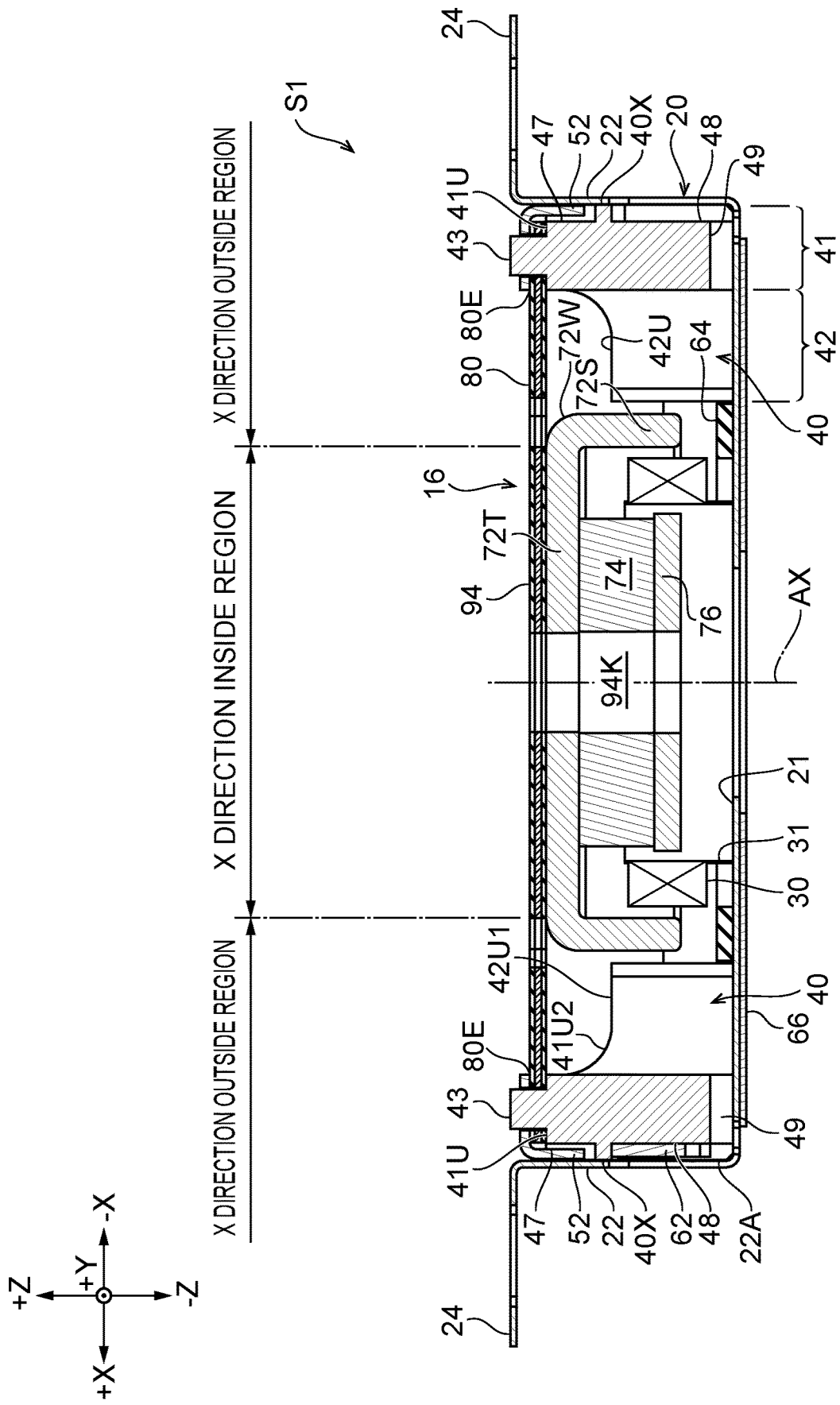
FIG. 5 is a cross-section (sectioned along line 6-6 in FIG. 4) illustrating an actuator of the first exemplary embodiment.

As illustrated in FIG. 5, the coil 30 is configured by coiled electrical wire, and is formed around the outer circumference of a bobbin 31. The coil 30 is fixed to an upper face of the base plate 21 of the outer frame 20 through the bobbin 31. The base plate 21 of the outer frame 20 corresponds to a "coil fixing portion" of the present disclosure.

Figure 6:
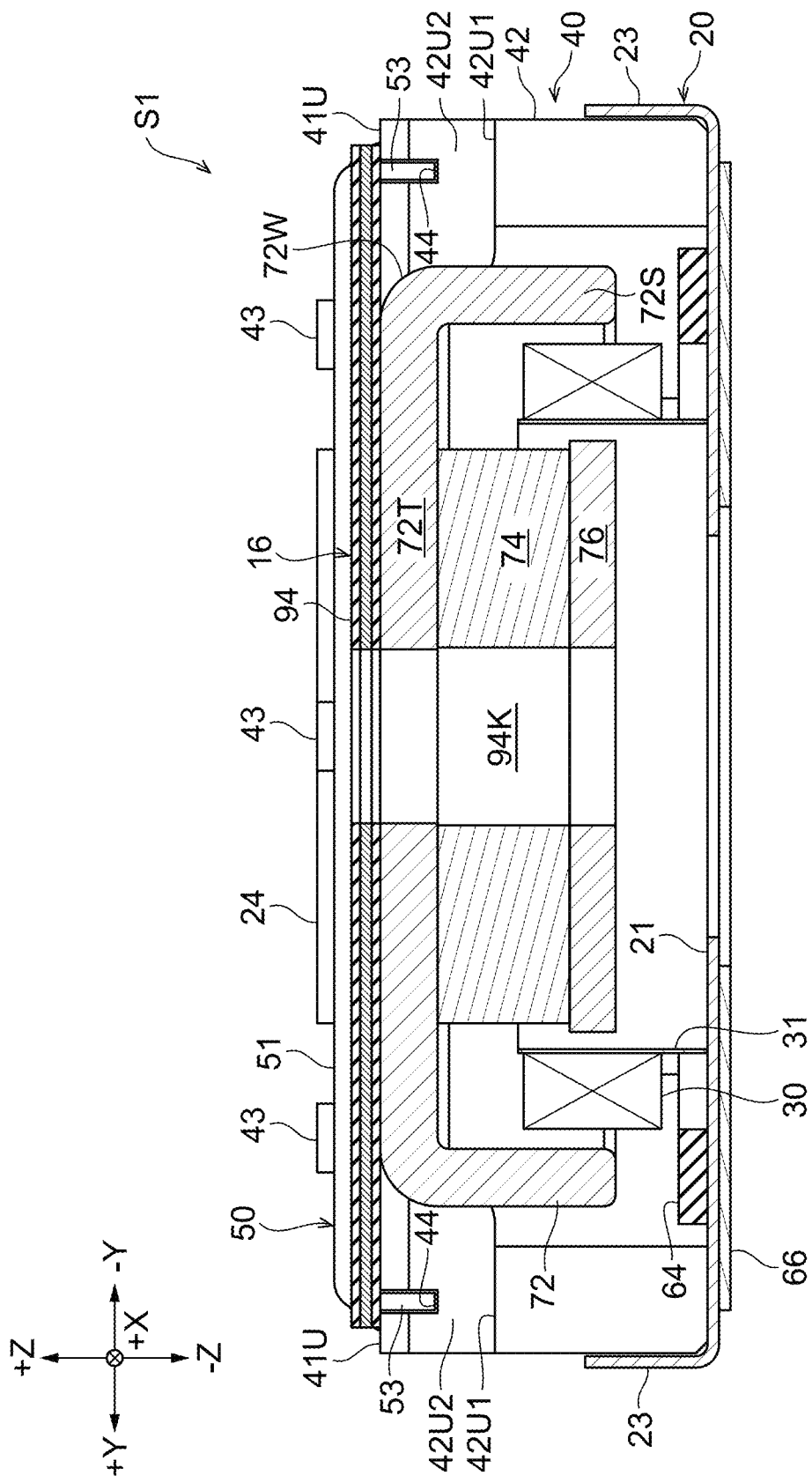
FIG. 6 is a cross-section (sectioned along line 7-7 in FIG. 4) illustrating an actuator of the first exemplary embodiment.

The bobbin 31 has a circular cylinder shape with its axial direction in an up-down direction. As illustrated in FIG. 5 and FIG. 6, a gap in the up-down direction is formed between the coil 30 and the base plate 21 of the outer frame 20. This gap is larger than the thickness of the cushioning member 64, described later. The pole piece 76 of the movable element 14 is disposed in a space at the circumferential inside of the coil 30, and a lower portion of the yoke 72 is disposed at the circumferential outside of the coil 30.

The cushioning member 64 is formed from an elastic member such as rubber. The cushioning member 64 is fixed to an upper face side of the base plate 21 of the outer frame 20 by adhesion or the like. The cushioning member 64 is positioned such that it can be abutted by the movable element 14 if, for example, the movable element 14 undergoes excessive downward displacement during vigorous vibration of the movable element 14. Specifically, the cushioning member 64 is disposed below a downward-extending portion 72S of the yoke 72. Both the cushioning member 64 and the downward-extending portion 72S of the yoke 72 have similar circular profiles in plan view.

Figure 2:
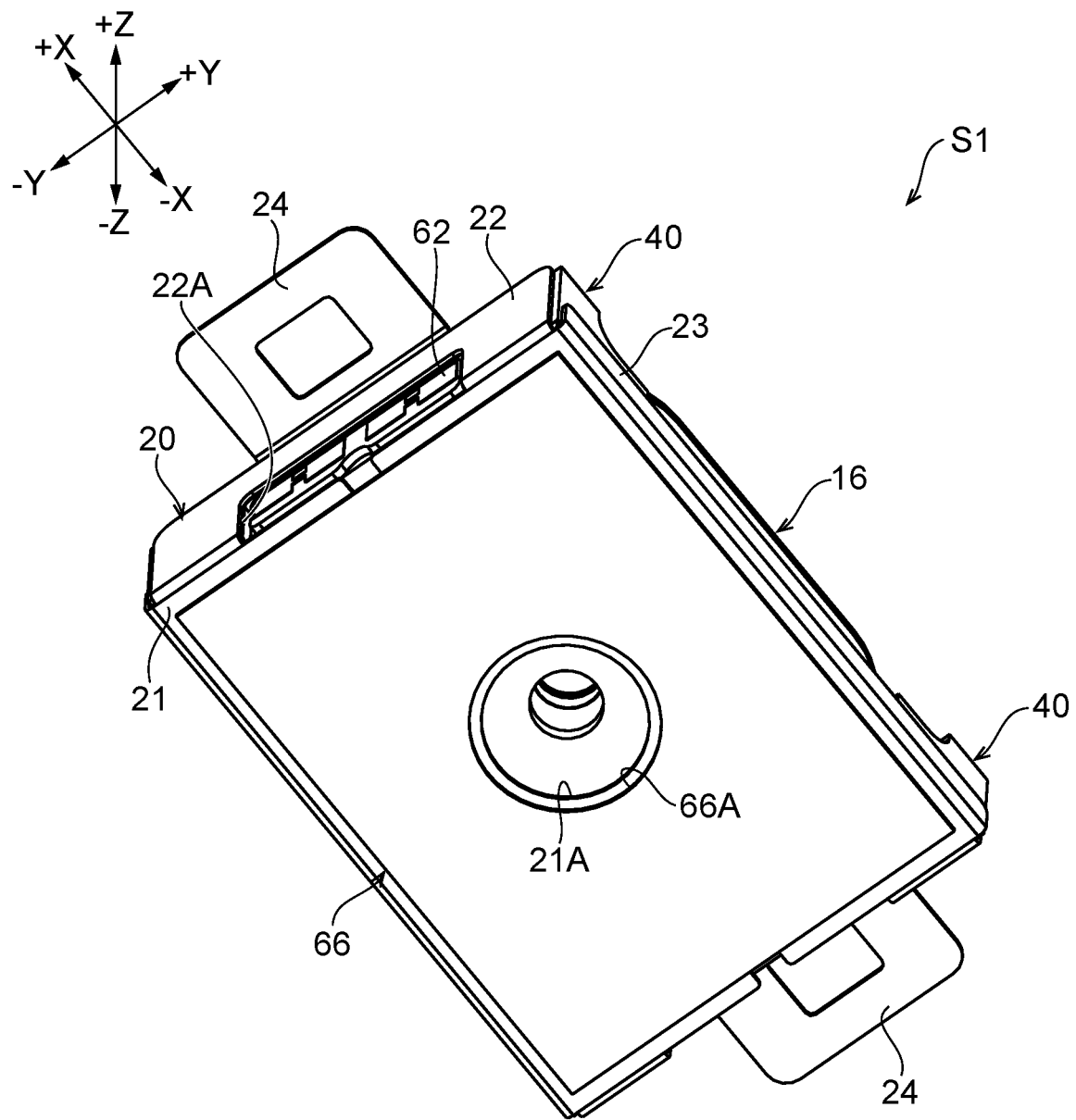
FIG. 2 is a perspective view (illustration as viewed from an oblique lower side) illustrating an actuator of the first exemplary embodiment.

The adhesive sheet 66 is a member used to attach the actuator S1 to another member. Both faces of the adhesive sheet 66 configure adhesive faces. As illustrated in FIG. 2, the adhesive sheet 66 is adhered to a lower face side of the base plate 21 of the outer frame 20. The adhesive sheet 66 is formed with a through hole 66A corresponding to the through hole 21A in the base plate 21 of the outer frame 20. The through hole 66A in the adhesive sheet 66 is a circular hole, and is slightly larger than the through hole 21A in the base plate 21 of the outer frame 20. As illustrated in FIG. 5, the adhesive sheet 66 is disposed so as to cover substantially the entire lower face (specifically a region covering at least 90%) of the base plate 21 of the outer frame 20.

The inner frames 40 are fixed to an upper face side of the base plate 21 of the outer frame 20. The inner frames 40 are configured by a one-side inner frame 40 disposed on the one side in the X direction, and an other-side inner frame 40 disposed on the other side in the X direction. The one-side inner frame 40 and the other-side inner frame 40 are configured by separate components having substantially the same structure as one another. Hereafter, reference simply to the inner frames 40 refers to both the one-side inner frame 40 and the other-side inner frame 40.

Figure 4:
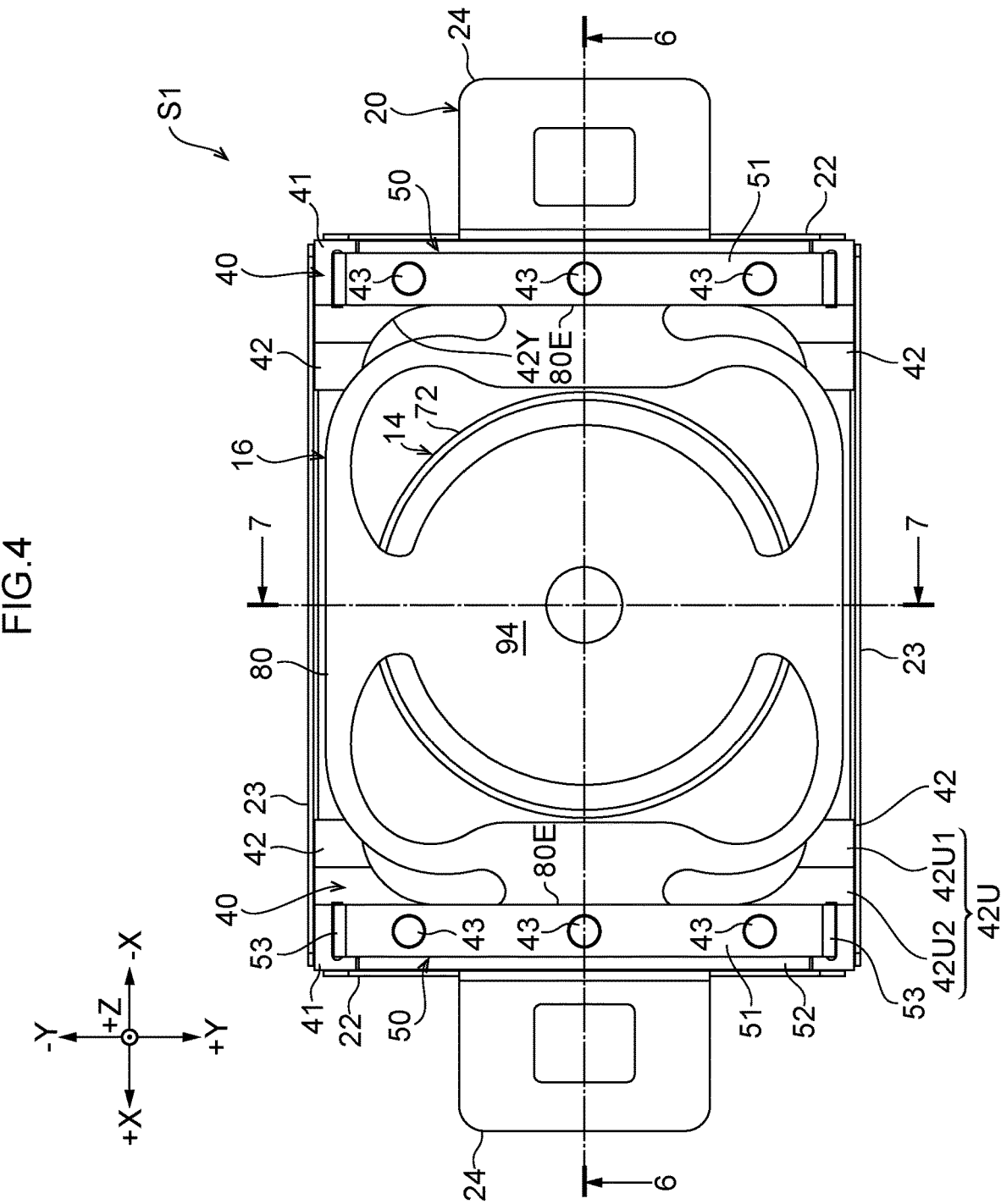
FIG. 4 is a plan view (illustration as viewed from a +Z direction) illustrating an actuator of the first exemplary embodiment.

As illustrated in FIG. 4 and FIG. 5, each of the inner frames 40 includes a upright-standing wall portion 41 (support body fixing portion) extending in the Y direction and having a wall thickness direction aligned with the X direction, and a pair of low wall portions 42 (collapse prevention portions) connected to both Y direction ends of the upright-standing wall portion 41.

An upper face 41U of the upright-standing wall portion 41 (see FIG. 5 and FIG. 10) is a flat face with a normal direction aligned with the upward direction. Plural circular column shaped pins 43 (three in the present exemplary embodiment) project upward from the upper face 41U of the upright-standing wall portion 41. The plural pins 43 are arranged so as to form a row along the Y direction.

As illustrated in FIG. 5 and FIG. 6, the upper faces 41U of the respective upright-standing wall portions 41 contact a lower face of the elastic support body 16, and the plural pins 43 are inserted into plural through holes 92A (see FIG. 9) in the elastic support body 16.

Figure 3:
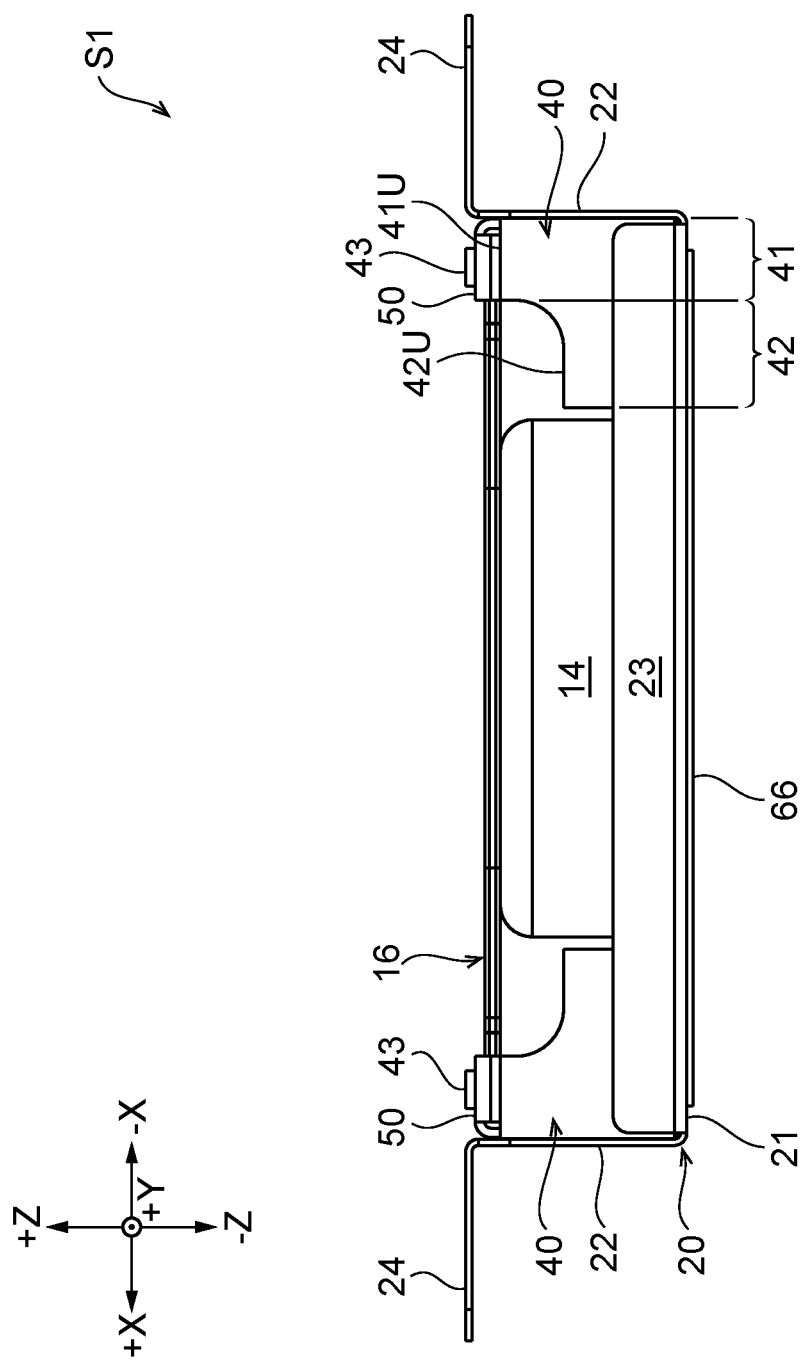
FIG. 3 is a side view (illustration as viewed from a +Y direction) illustrating an actuator of the first exemplary embodiment.

The low wall portions 42 are formed so as to be lower in height in the up-down direction than the upright-standing wall portions 41. Accordingly, as illustrated in FIG. 3, the upper faces 42U of the low wall portions 42 are positioned at lower positions than the upper faces 41U of the upright-standing wall portions 41.

As illustrated in FIG. 4, a pair of the low wall portions 42 are formed at the two Y direction ends of each single upright-standing wall portion 41 that extends in the Y direction. The low wall portions 42 are positioned at the X direction insides of the respective upright-standing wall portions 41. Upper portions of the upright-standing wall portions 41 support the elastic support body 16, such that when a force toward the X direction inside (a force from the elastic support body 16) is applied to the upper portions of the upright-standing wall portions 41, the low wall portions 42 positioned at the X direction insides of the upright-standing wall portions 41 function as "collapse prevention portions" that prevent the upright-standing wall portions 41 ("support body fixing portions") from collapsing toward the X direction inside.

As illustrated in FIG. 4 and FIG. 5, the upper faces 42U of the low wall portions 42 are each configured including a flat face portion 42U1 and an inclined portion 42U2. The flat face portions 42U1 of the upper faces 42U of the low wall portions 42 are flat faces with a normal direction aligned with the upward direction. The inclined portions 42U2 of the upper faces 42U of the low wall portions 42 are positioned on the upright-standing wall portion 41 side of the flat face portions 42U1, and are inclined such that the height positions of the inclined portions 42U2 increase on progression toward the upright-standing wall portion 41. As illustrated in FIG. 5 and FIG. 6, the positions where the inclined portions 42U2 of the upper faces 42U of the low wall portions 42 are highest on the upright-standing wall portion 41 side are nonetheless lower positions than the upper face 41U of the upright-standing wall portion 41. As illustrated in FIG. 5, the inclined portions 42U2 of the upper faces 42U of the low wall portions 42 curve in a downward-protruding profile in side view (in other words, as viewed along the Y direction).

As illustrated in FIG. 4, a Y direction dimension of each of the low wall portions 42 increases toward the X direction outside, this being the side corresponding to the upright-standing wall portion 41, and decreases on progression toward the X direction inside, this being the direction heading away from the upright-standing wall portion 41. A Y direction outside face (not allocated a reference numeral) of each of the low wall portions 42 lies in substantially the same plane as a Y direction outside face (not allocated a reference numeral) of the corresponding upright-standing wall portion 41 (specifically, in a flat plane with a normal direction aligned with the Y direction outside). On the other hand, as illustrated in FIG. 4, a Y direction inside face 42Y (only that of the low wall portion 42 on the upper right of FIG. 4 is allocated a reference numeral) of each of the low wall portions 42 is displaced gradually toward the Y direction outside on progression the X direction inside, and more specifically is curved in a profile protruding toward the Y direction outside in plan view.

As illustrated in FIG. 6, the upper face 41U of the upright-standing wall portion 41 of each of the inner frames 40 is formed with a groove 44 with a downward depth direction. The covers 50 (second insertion portions 53) are partially inserted into the grooves 44. Each of the grooves 44 opens toward the up-down direction upper side and also toward the X direction inside. On the other hand, the respective grooves 44 do not open toward the X direction outside. The respective grooves 44 are positioned on both Y direction sides of each of the inner frames 40. As illustrated in FIG. 6, the Y direction positions of the grooves 44 overlap with the positions formed with the low wall portions 42. The depth (Z direction dimension) of the grooves 44 and the second insertion portions 53 of the covers 50 both extend as far as parts of the low wall portions 42.

As illustrated in FIG. 10, X direction outside faces 40X of the inner frames 40 are formed with first recesses 48 that are recessed toward the X direction inside. The first recesses 48 are formed at the lower sides of second recesses 47, described later. As illustrated in FIG. 1 and FIG. 5, the terminal 62 is disposed in the corresponding first recess 48.

The inner frames 40 are further formed with wiring passage portions 49 (FIG. 5, FIG. 10) through which the wiring (not illustrated in the drawings) of the coil 30 is led out to the exterior. The wiring passage portions 49 are grooves formed in lower faces of the inner frames 40 at Y direction central positions.

Figure 8:
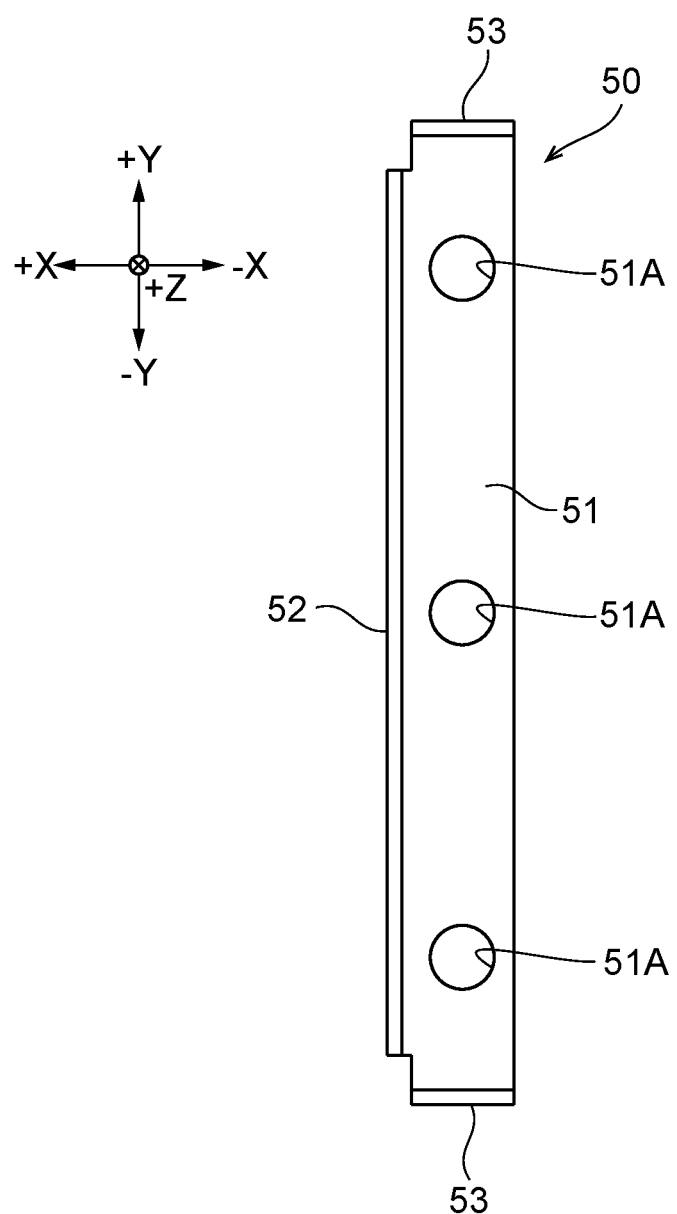
FIG. 8 is an illustration of a cover of the first exemplary embodiment.

FIG. 8 illustrates the covers 50. The covers 50 have a function of fixing the elastic support body 16 to the inner frames 40. A pair of the covers 50 are provided, and the pair of covers 50 have the same structure as one another. Note that the respective arrows illustrated in FIG. 8 are provided as a reference based on the cover 50 on the one side in the X direction (the cover 50 on the left side in FIG. 4).

Each of the covers 50 includes a clamp portion 51 that clamps the elastic support body 16 between the cover 50 and the corresponding inner frame 40, a first insertion portion 52 that is inserted between the corresponding inner frame 40 and the outer frame 20, and the second insertion portions 53 that are inserted into the grooves 44 in the corresponding inner frame 40.

Specific explanation follows regarding the first insertion portion 52. As illustrated in FIG. 10, the X direction outside faces 40X of the inner frames 40 are formed with the second recesses 47 that are recessed toward the X direction inside. The second recesses 47 open upward. As illustrated in FIG. 5, although the X direction outside faces 40X of the inner frames 40 abut the first upright plates 22 of the outer frame 20, spaces are formed between the X direction outside faces 40X of the inner frames 40 and the first upright plates 22 of the outer frame 20 at locations corresponding to the second recesses 47. The first insertion portions 52 of the covers 50 are inserted into these spaces.

Each of the covers 50 is manufactured from a single sheet. Bent portions (not allocated reference numerals) that are bent with respect to the plate thickness direction are thus formed between the clamp portion 51 and the first insertion portion 52, and between the clamp portion 51 and the second insertion portions 53.

Each of the clamp portions 51 is configured in a flat plate shape with a plate thickness direction aligned with the up-down direction, and has a rectangular profile with its length direction in the Y direction.

Each of the clamp portions 51 is formed with plural through holes 51A (three in the present exemplary embodiment) formed in a row along the Y direction. The plural pins 43 of the upright-standing wall portion 41 of the corresponding inner frame 40 are inserted into the plural through holes 51A. The plural through holes 51A are configured including a through hole 51A positioned at the Y direction center of the clamp portion 51, and plural through holes 51A, 51A (two in the present exemplary embodiment) formed at symmetrical Y direction positions with respect to this through hole 51A. The through holes 51A have circular profiles.

The first insertion portion 52 is formed at the X direction outside of the corresponding clamp portion 51, and is configured in a flat plate shape with a plate thickness direction aligned with the X direction. The first insertion portion 52 is formed by bending a location further to the X direction outside than the clamp portion 51 downward. A Y direction one-side end of the first insertion portion 52 is positioned further to the one side in the Y direction than the through hole 51A formed furthest to the one side in the Y direction out of the plural through holes 51A in the clamp portion 51, and a Y direction other-side end of the first insertion portion 52 is positioned further toward the other side in the Y direction than the through hole 51A formed furthest to the other side in the Y direction out of the plural through holes 51A in the clamp portion 51.

A pair of the second insertion portions 53 are formed at the Y direction outsides of the clamp portion 51, and are each configured in a flat plate shape with a plate thickness direction aligned with the Y direction. The second insertion portions 53 are formed by bending locations further to the Y direction outside than the clamp portions 51 downward.

The overall elastic support body 16 is configured in a flat plate shape with a plate thickness direction aligned with the up-down direction.

One part of the elastic support body 16 is fixed to the attachment member 12, and another part of the elastic support body 16 is fixed to the movable element 14. A location of the elastic support body 16 between the location fixed to the attachment member 12 and the location fixed to the movable element 14 configures a location that deforms when the movable element 14 undergoes displacement (vibrates).

Figure 9:
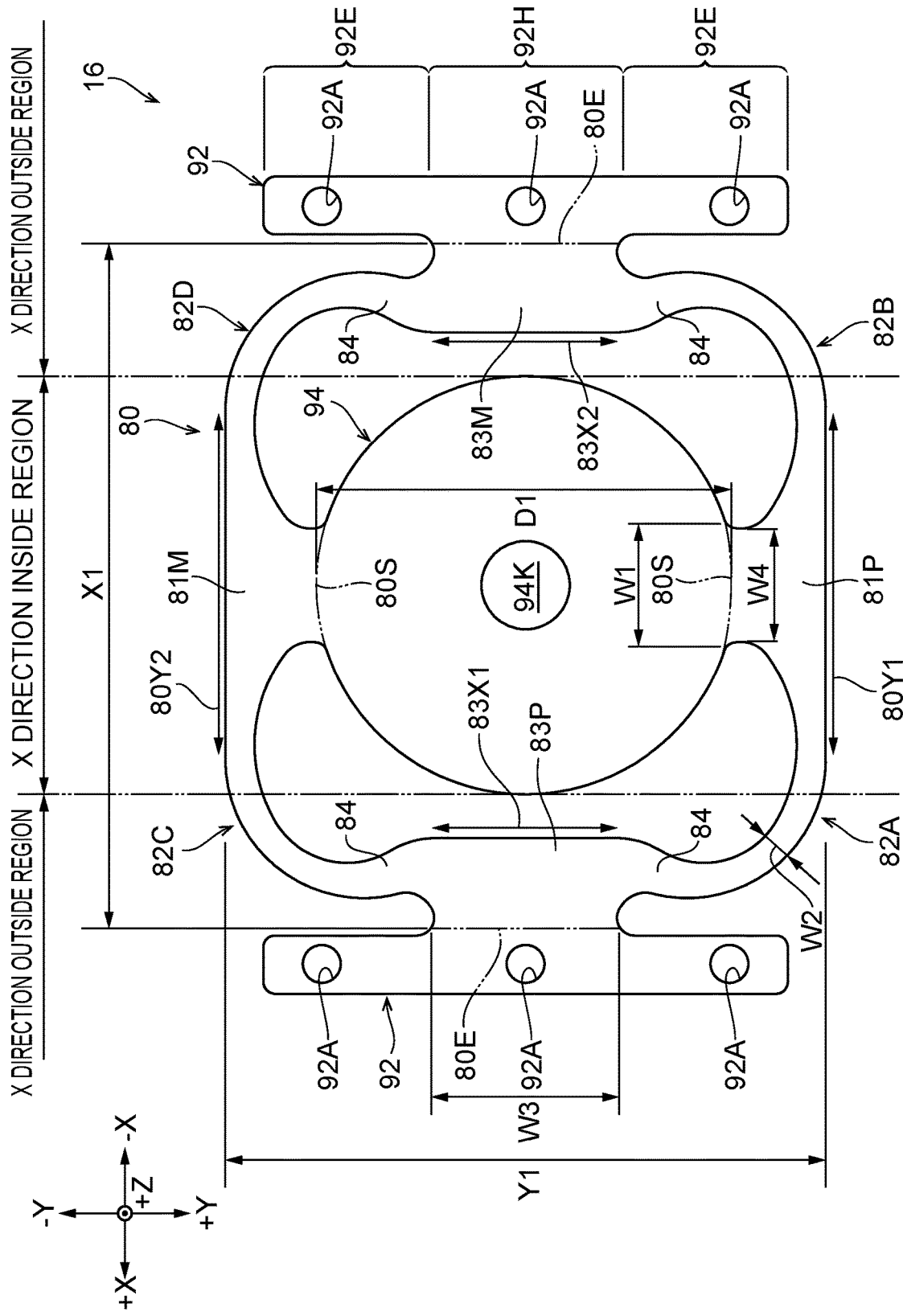
FIG. 9 is a plan view illustrating an elastic support body of the first exemplary embodiment.

Namely, as illustrated in FIG. 9, the elastic support body 16 is configured by attachment member-side fixed portions 92 that are fixed to the attachment member 12, a movable element-side fixed portion 94 that is fixed to the movable element 14, and a deformable portion 80 located between the attachment member-side fixed portions 92 and the movable element-side fixed portion 94.

Plural through holes 92A (three in the present exemplary embodiment) are formed in each of the attachment member-side fixed portions 92. The plural pins 43 of the upright-standing wall portions 41 of the inner frames 40 are inserted through the respective through holes 92A in the attachment member-side fixed portions 92. The through holes 92A have circular profiles, and the through holes 92A are formed to a size just large enough to accommodate the pins 43.

Each of the attachment member-side fixed portions 92 includes a boundary portion 80E configuring a boundary location between the attachment member-side fixed portion 92 and the deformable portion 80. The boundary portions 80E correspond to boundaries between locations of the elastic support body 16 that are fixed to the attachment member 12 (locations clamped between the inner frames 40 and the covers 50 in the present exemplary embodiment) and locations of the elastic support body 16 that are not fixed. The boundary portions 80E are locations extending in a straight line along the Y direction. The boundary portions 80E are synonymous with finish ends 80E of the deformable portion 80, described later.

As illustrated in FIG. 9, each of the attachment member-side fixed portions 92 is configured by a body 92H at a position aligned in the Y direction with the boundary portions 80E (finish ends 80E), and extension portions 92E positioned at the Y direction outsides of the body 92H. The extension portions 92E are formed on both the one and the other side in the Y direction of the body 92H. Due to the combination of the body 92H and the pair of extension portions 92E, each of the attachment member-side fixed portions 92 is thereby formed with an elongated profile with its length direction along the Y direction. The plural through holes 92A are respectively formed in the body 92H, one of the extension portions 92E, and the other of the extension portions 92E of the respective attachment member-side fixed portions 92.

As illustrated in FIG. 9, the movable element-side fixed portion 94 has a circular external profile, and is penetrated at its center by a circular reference hole 94K. Note that as described later, through holes with the same shape as the reference hole 94K of the movable element-side fixed portion 94 are also formed in the movable element 14 (namely, through the yoke 72, the magnet 74, and the pole piece 76). In order to aid understanding of the drawings, the through holes in the movable element 14 are also labeled 94K so as to match the reference number of the reference hole 94K in the movable element-side fixed portion 94. As illustrated in FIG. 5 and FIG. 6, the entirety of a lower face of the movable element-side fixed portion 94 is fixed to the yoke 72 of the movable element 14 by adhesion or the like. Specifically, the entire movable element-side fixed portion 94 is fixed to the yoke 72 of the movable element 14 over a region spanning from an edge of the reference hole 94K (inner edge) to a circular outer edge (outer edge).

The yoke 72 is configured by a soft magnetic body, and has a bottomed cylinder shaped structure. Specifically, as illustrated in FIG. 5, the yoke 72 is configured by a top wall 72T with a wall thickness direction aligned with the up-down direction, and the downward-extending portion 72S extending downward from the entire outer circumference of the top wall 72T. The top wall 72T is formed with a circular profile in plan view, and a wall thickness direction of the downward-extending portion 72S is a direction perpendicular to a central axis of the top wall 72T (this central axis being aligned with the center-of-gravity axis AX of the movable element 14; see FIG. 10).

The magnet 74 is fixed to a lower face of the top wall 72T of the yoke 72. The pole piece 76 is configured by a soft magnetic body, and is fixed to a lower face of the magnet 74. The magnet 74 and the pole piece 76 have similar profiles in plan view, and more specifically, have circular profiles. Note that the pole piece 76 has a slightly larger external profile than the magnet 74. In other words, the diameter of the pole piece 76 is slightly larger than the diameter of the magnet 74.

As illustrated in FIG. 5 and FIG. 6, the downward-extending portion 72S of the yoke 72 is disposed at the peripheral outside of the magnet 74 and the pole piece 76 such that a uniform space is formed therebetween. A lower end of the downward-extending portion 72S of the yoke 72 is aligned with the height of a lower end of the pole piece 76. The coil 30 is disposed in the space formed between the magnet 74 and pole piece 76 and the downward-extending portion 72S of the yoke 72.

As illustrated in FIG. 10, at an outer face of the yoke 72 that has a bottomed cylinder shaped structure, a curved face 72W (see FIG. 5, FIG. 6) joining an upper planar face 72T1 that has a normal direction aligned with the upward direction to an outside face 72S1 that has a normal direction aligned with a horizontal direction is formed at a boundary between the top wall 72T and the downward-extending portion 72S. Out of the upper planar face 72T1, the curved face 72W, and the outside face 72S1 that configure the outer faces of the yoke 72, the upper planar face 72T1 that has a normal direction aligned with the upward direction is adhered to the elastic support body 16. Specifically, the entire upper planar face 72T1 is adhered to the elastic support body 16.

The elastic support body 16 and the movable element 14 are each formed with the reference holes 94K so as to enable mutual positioning therebetween. Specifically, the reference holes 94K are formed through each of the elastic support body 16, the yoke 72, the magnet 74, and the pole piece 76. Each of the reference holes 94K are formed with the same size and profile.

As illustrated in FIG. 9, from start ends 80S to the finish ends 80E, the deformable portion 80 includes a Y direction one-side portion 81P and a Y direction other-side portion 81M, then arm portions 82A, 82B, 82C, 82D, and then an X direction one-side portion 83P and an X direction other-side portion 83M.

If the deformable portion 80 is considered as a location extending from the movable element-side fixed portion 94 side toward the attachment member-side fixed portion 92 side, the start ends 80S are locations where the deformable portion 80 begins. Specifically, the start ends 80S correspond to boundaries between the movable element-side fixed portion 94 and the deformable portion 80. The start ends 80S include a start end 80S on the one side in the Y direction and a start end 80S on the other side in the Y direction.

The Y direction one-side portion 81P and the Y direction other-side portion 81M are respective locations adjoining the movable element-side fixed portion 94 in the Y direction. The Y direction one-side portion 81P is positioned on the one side in the Y direction with respect to the movable element-side fixed portion 94, and the Y direction other-side portion 81M is positioned on the other side in the Y direction with respect to the movable element-side fixed portion 94. The Y direction one-side portion 81P includes the start end 80S on the one side in the Y direction, and the Y direction other-side portion 81M includes the start end 80S on the other side in the Y direction.

From the Y direction one-side portion 81P, the deformable portion 80 branches toward the one side in the X direction and the other side in the X direction so as to join to a first arm portion 82A and a second arm portion 82B.

From the Y direction other-side portion 81M, the deformable portion 80 also branches toward the one side in the X direction and the other side in the X direction so as to join to a third arm portion 82C and a fourth arm portion 82D. In this manner, the Y direction one-side portion 81P configures a Y direction one-side connection portion 81P connected to both the first arm portion 82A and the second arm portion 82B, and the Y direction other-side portion 81M configures a Y direction other-side connection portion 81M connected to both the third arm portion 82C and the fourth arm portion 82D.

At the X direction one-side portion 83P, out of the two arm portions 82A, 82B branching from the Y direction one-side connection portion 81P, the first arm portion 82A on the one side in the X direction, and out of the two arm portions 82C, 82D branching from the Y direction other-side connection portion 81M, the third arm portion 82C on the one side in the X direction meet up with each other.

At the X direction other-side portion 83M, out of the two arm portions 82A, 82B branching from the Y direction one-side connection portion 81P, the second arm portion 82B on the other side in the X direction, and out of the two arm portions 82C, 82D branching from the Y direction other-side connection portion 81M, the fourth arm portion 82D on the other side in the X direction meet up with each other.

In this manner, the X direction one-side portion 83P configures an X direction one-side connection portion 83P connected to both the first arm portion 82A and the third arm portion 82C, and the X direction other-side portion 83M configures an X direction other-side connection portion 83M connected to both the second arm portion 82B and the fourth arm portion 82D.

Operation

In the actuator S1 configured as described above, the movable element 14 is supported by the elastic support body 16, and in a state in which current is not flowing through the coil 30, the actuator S1 is located at an initial position illustrated in FIG. 5. Propulsion generated in the movable element 14 is essentially propulsion behaving according to Fleming's left hand rule. In the actuator S1, the coil 30 is fixed to a plate 20, and the movable element 14 is configured by the magnet 74 and so on, such that when current flows through the coil 30, propulsion is induced in the movable element 14 as a reaction force against force induced by the coil 30. Alternating current is passed through the coil 30 so as to cause the movable element 14 to vibrate with an up-down direction amplitude running along the center-of-gravity axis AX.

Operation and Advantageous Effects

Next, explanation follows regarding operation and advantageous effects of the present exemplary embodiment.

In the present exemplary embodiment, the actuator S1 includes the attachment member 12 configured including the coil 30, and the movable element 14 configured including the magnet 74.

The actuator S1 further includes the elastic support body 16. The elastic support body 16 includes the attachment member-side fixed portions 92 that are fixed to the attachment member 12, the movable element-side fixed portion 94 that is fixed to the movable element 14, and the deformable portion 80 that is positioned between the attachment member-side fixed portions 92 and the movable element-side fixed portion 94. The deformable portion 80 of the elastic support body 16 undergoes elastic deformation so as to allow the movable element 14 to undergo relative displacement in a predetermined displacement direction (±Z direction) with respect to the attachment member 12.

Moreover, as illustrated in FIG. 9, in the present exemplary embodiment the finish ends 80E of the deformable portion 80 (the attachment member-side fixed portion 92 side ends of the deformable portion 80) are respectively positioned in a region on the one side in the X direction with respect to the movable element-side fixed portion 94 and a region on the other side in the X direction with respect to the movable element-side fixed portion 94 (referred to hereafter as "X direction outside regions"), and are not positioned in a region overlapping with the movable element-side fixed portion 94 in the X direction (referred to hereafter as an "X direction inside region").

This configuration enables a reduction in the size of the actuator S1 in comparison to a configuration in which the finish ends 80E of the deformable portion 80 are also positioned within the X direction inside region.

More specifically, in a configuration in which the finish ends 80E of the deformable portion 80 are positioned in the X direction inside region as well as in the X direction outside regions, the configuration of the actuator S1 would need to be provided with a structure to fix the elastic support body 16 within the X direction inside region. Since the elastic support body 16 is a member that supports the movable element 14 that undergoes displacement (for example vibrational displacement), such structures for fixing the elastic support body 16 would require a degree of strength. Providing such a structure would require a certain amount of space within the X direction inside region.

By contrast, in the present exemplary embodiment, the finish ends 80E of the deformable portion 80 are positioned in the X direction outside regions, and are not positioned in the X direction inside region. Such a structure to fix the elastic support body 16 is therefore not required within the X direction inside region, with the result that the actuator S1 lends itself to a reduction in size.

Moreover, in the present exemplary embodiment, the deformable portion 80 is configured including the Y direction one-side portion 81P and the Y direction other-side portion 81M that include the respective start ends 80S, and the X direction one-side portion 83P and the X direction other-side portion 83M that include the respective finish ends 80E. The four arm portions 82A, 82B, 82C, 82D join between these respective locations. This configuration enables a comparatively long length to be secured for the arm portions 82A, 82B, 82C, 82D of the deformable portion 80, facilitates configuration of a symmetrical structure for the deformable portion 80 in the X direction and the Y direction, and also enables rotation about X direction and Y direction axes to be suppressed. The elastic support body 16 thus provides stable support in the displacement direction of the movable element 14 (the ±Z direction).

Moreover, in the present exemplary embodiment, the Y direction one-side portion 81P configures the Y direction one-side connection portion 81P that includes one of the start ends 80S and is connected to both the first arm portion 82A and the second arm portion 82B, and the Y direction other-side portion 81M configures the Y direction other-side connection portion 81M that includes one of the start ends 80S and is connected to both the third arm portion 82C and the fourth arm portion 82D. This configuration enables an increase in the deformation amounts of the Y direction one-side portion 81P and the Y direction other-side portion 81M provided with the respective start ends 80S to be suppressed.

Figure 17:
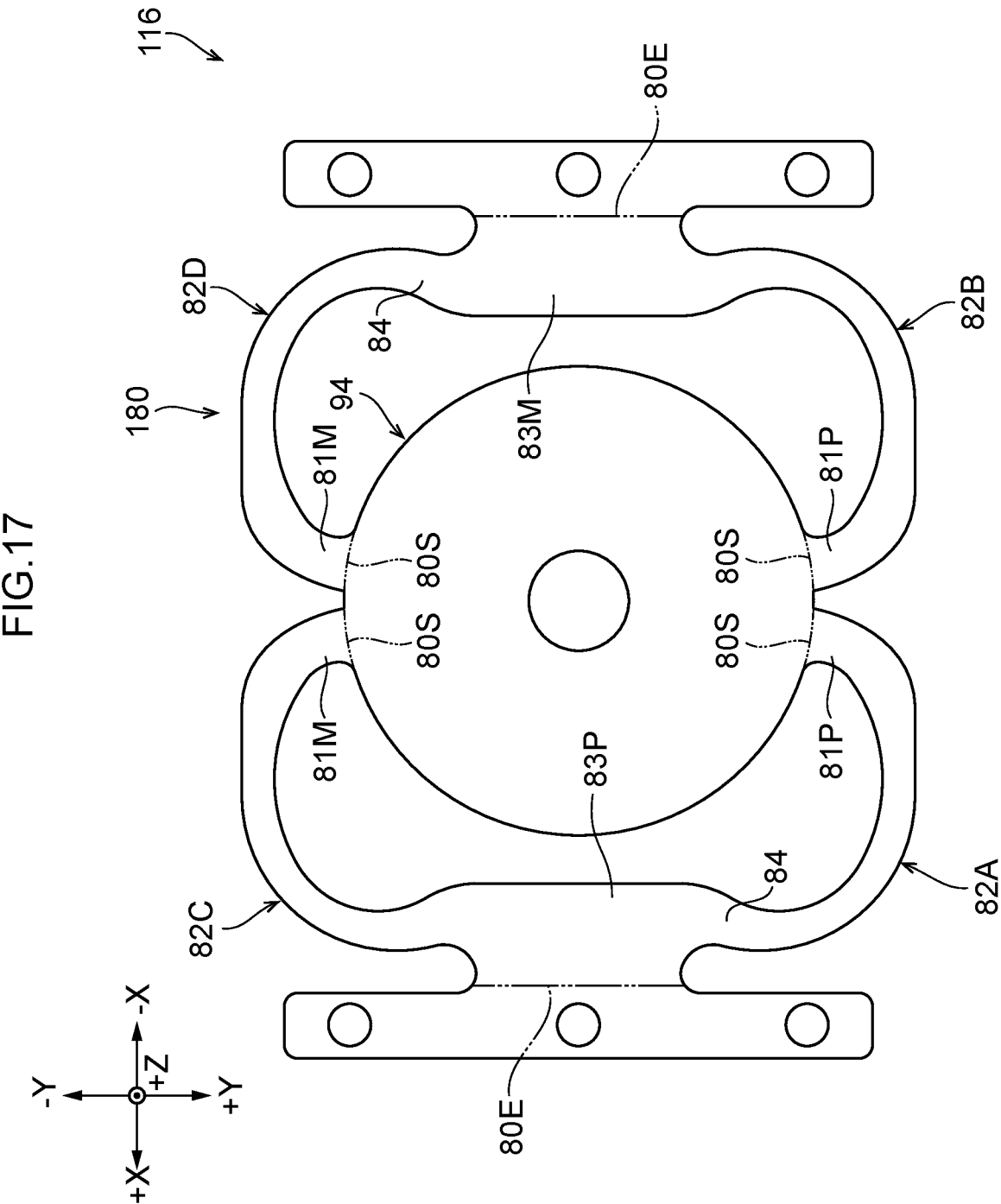
FIG. 17 is a plan view illustrating a modified example of an elastic support body.

Namely, since the Y direction one-side portion 81P and the Y direction other-side portion 81M both include a start end, the deformation amounts thereof might be liable to become large deformation amounts. However, the present exemplary embodiment makes it easy to secure rigidity of the Y direction one-side portion 81P and the Y direction other-side portion 81M, thus enabling an increase in the deformation amounts of the Y direction one-side portion 81P and the Y direction other-side portion 81M to be better suppressed than, for example, in the configuration illustrated in FIG. 17.

In particular, as illustrated in FIG. 9, in the present exemplary embodiment a width W1 (X direction dimension) of the start ends 80S of the Y direction one-side connection portion 81P and the Y direction other-side connection portion 81M is formed so as to be at least twice (more specifically at least 2.5 times) a minimum width W2 of the respective arm portions 82A, 82B, 82C, 82D, thus effectively suppressing the deformation amount in the vicinity of the start ends 80S.

Figure 21:
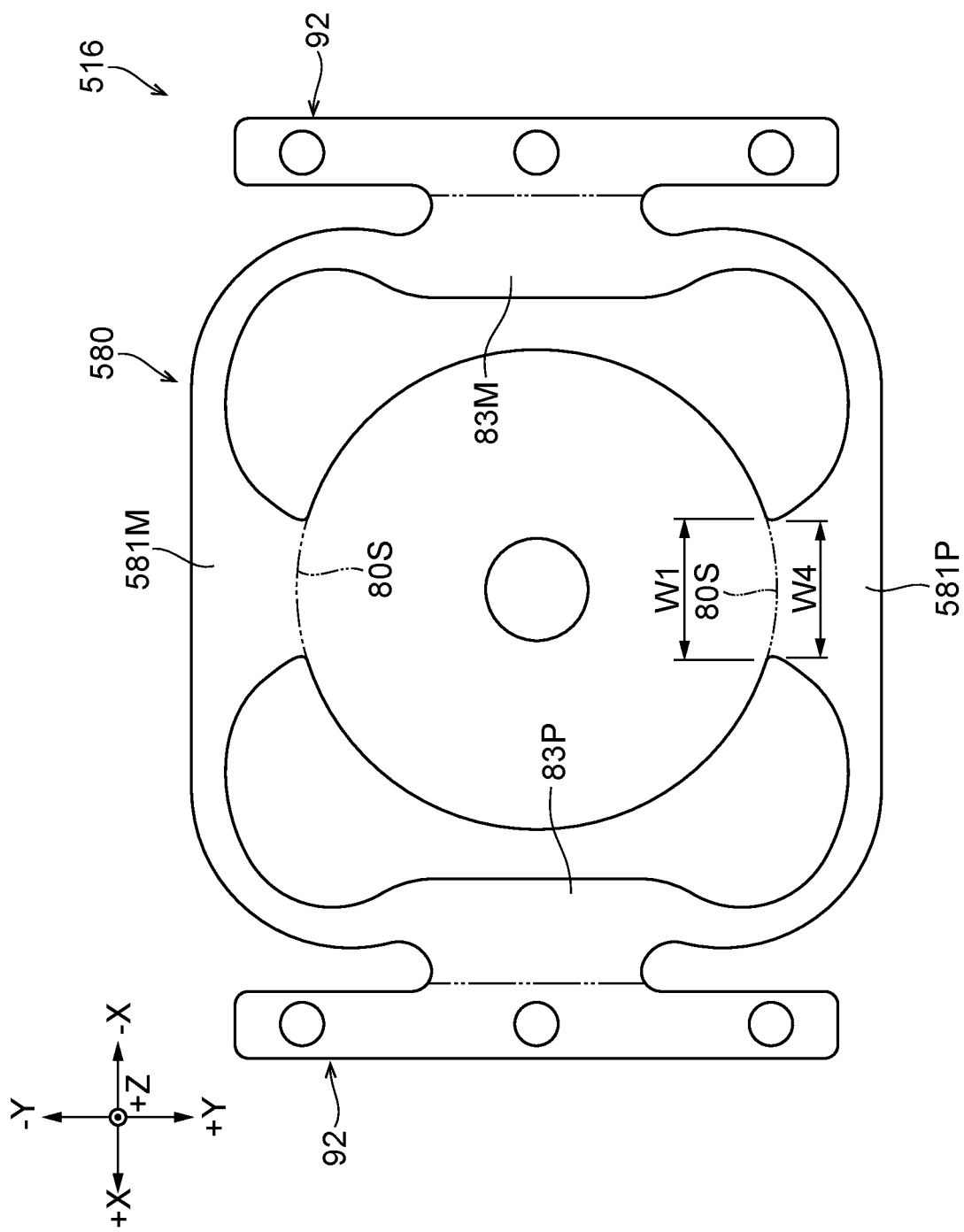
FIG. 21 is a plan view illustrating a modified example of an elastic support body.

Moreover, in the present exemplary embodiment, the width W1 (X direction dimension) of the start ends 80S of the Y direction one-side connection portion 81P and the Y direction other-side connection portion 81M is larger than a minimum value W4 (minimum width) of an X direction dimension of the Y direction one-side connection portion 81P and the Y direction other-side connection portion 81M. Accordingly, stress can be better suppressed from concentrating in the start ends 80S than in a configuration (see FIG. 21) in which the width W1 (X direction dimension) of the start ends 80S of the Y direction one-side connection portion 81P and the Y direction other-side connection portion 81M matches the minimum value W4 (minimum width) of the X direction dimension of the Y direction one-side connection portion 81P and the Y direction other-side connection portion 81M.

In particular, as illustrated in FIG. 9, in the present exemplary embodiment the width W1 (X direction dimension) of the start ends 80S of the Y direction one-side connection portion 81P and the Y direction other-side connection portion 81M is formed so as to be at least 1.5 times (more specifically at least 2.5 times) the minimum width W2 of the respective arm portions 82A, 82B, 82C, 82D, thereby effectively suppressing the deformation amount in the vicinity of the start ends 80S.

Figure 18:
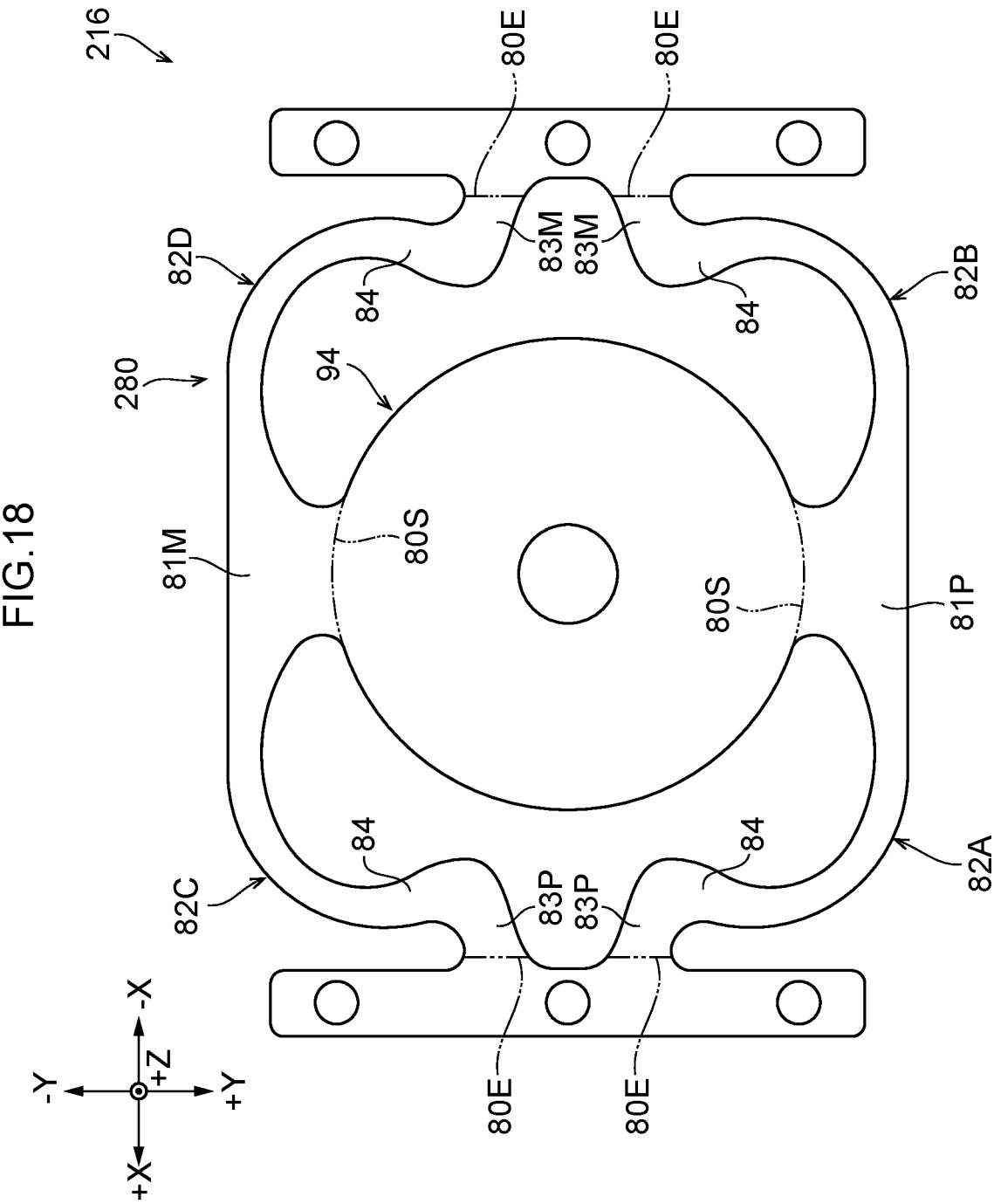
FIG. 18 is a plan view illustrating a modified example of an elastic support body.

Moreover, in the present exemplary embodiment, the X direction one-side portion 83P configures the X direction one-side connection portion 83P that includes one of the finish ends 80E and is connected to both the first arm portion 82A and the third arm portion 82C, and the X direction other-side portion 83M configures the X direction other-side connection portion 83M that includes one of the finish ends 80E and is connected to both the second arm portion 82B and the fourth arm portion 82D. This enables an increase in the deformation amounts of the X direction one-side portion 83P and the X direction other-side portion 83M provided with the respective finish ends 80E to be suppressed in comparison to, for example, the configuration illustrated in FIG. 18.

In particular, as illustrated in FIG. 9, in the present exemplary embodiment a width W3 (Y direction dimension) of the finish ends 80E of the X direction one-side connection portion 83P and the X direction other-side connection portion 83M is formed so as to be at least twice (more specifically at least three times) the minimum width W2 of the respective arm portions 82A, 82B, 82C, 82D, thereby effectively suppressing the deformation amount in the vicinity of the finish ends 80E.

Moreover, as illustrated in FIG. 9, in the present exemplary embodiment, the positions of the finish ends 80E in the Y direction are contained within a Y direction range in which the movable element-side fixed portion 94 is formed (in the present exemplary embodiment, within a range corresponding to the diameter D1 of the movable element-side fixed portion 94). This configuration makes it easier to secure the length of the respective arm portions from the start ends 80S on both Y direction sides.

Moreover, in the present exemplary embodiment, X direction inside ends of both connection portions, namely the X direction one-side connection portion 83P and the X direction other-side connection portion 83M, configure linear edges 83X1, 83X2 extending in straight lines along the Y direction. The linear edges 83X1, 83X2 are positioned at the Y direction center of the deformable portion 80, and have a Y direction dimension of at least 90% of the Y direction dimensions of the finish ends 80E. This enables the connection portions, namely the X direction one-side connection portion 83P and the X direction other-side connection portion 83M to be formed with a large size and good balance, and thus provide stable support to the movable element 14.

Figure 20:
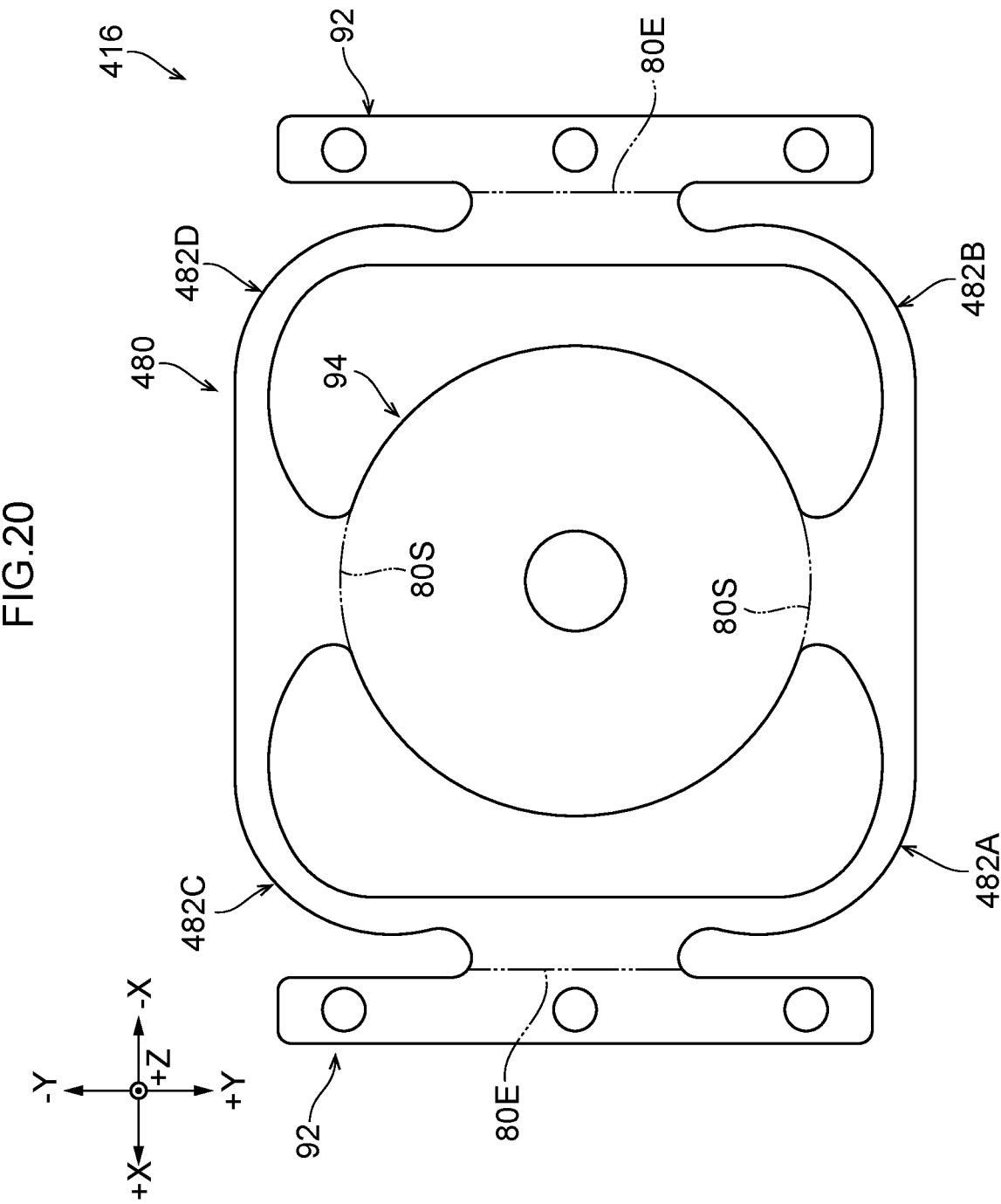
FIG. 20 is a plan view illustrating a modified example of an elastic support body.

As illustrated in FIG. 9, in the present exemplary embodiment each of the four arm portions 82A, 82B, 82C, 82D is configured including a return portion 84 with an extension direction oriented toward the Y direction inside and the X direction inside. This enables the length of the arm portions 82A, 82B, 82C, 82D to be made longer without increasing the overall size of the actuator S1 in comparison to configurations in which the arm portions 82A, 82B, 82C, 82D are not provided with the return portions 84 (see FIG. 20).

Moreover, in the present exemplary embodiment, the deformable portion 80 does not have a split configuration. In other words, all locations included in the deformable portion 80 are interconnected. For example, the Y direction one-side portion 81P and the Y direction other-side portion 81M are connected together through the respective arm portions 82A, 82B, 82C, 82D, the X direction one-side portion 83P, and the X direction other-side portion 83M. This affords the elastic support body 16 a high level of durability.

Note that in the present exemplary embodiment, the elastic support body 16 is formed as a single unit including not only the deformable portion 80 but also the attachment member-side fixed portions 92 and the movable element-side fixed portion 94.

Moreover, in the present exemplary embodiment, an end on the one side in the Y direction and an end on the other side in the Y direction of each of the attachment member-side fixed portions 92 are positioned further to the Y direction outsides than the finish ends 80E. Namely, the Y direction length of the attachment member-side fixed portions 92 is longer than the Y direction length of the finish ends 80E, such that the attachment member-side fixed portions 92 extend out on both Y direction sides. This enables a fixing region for the elastic support body 16 to the attachment member 12 to be made larger in order to stably fix the elastic support body 16.

Moreover, in the actuator S1 of present exemplary embodiment, the pair of upright-standing wall portions 41 ("support body fixing portions") are provided with the low wall portions 42 ("collapse prevention portions") in order to prevent collapse toward the X direction inside. This serves to increase the durability of the actuator S1.

In particular, as illustrated in FIG. 4, in the present exemplary embodiment the low wall portions 42 of the inner frames 40 are disposed at the X direction inside with respect to the upright-standing wall portions 41 ("support body fixing portions"), and are formed as far as positions locally coinciding with the deformable portion 80 of the elastic support body 16 in plan view, while also being formed lower than the upright-standing wall portions 41. This increases the durability of the actuator S1 while also preventing interference between the low wall portions 42 and the elastic support body 16.

Moreover, as illustrated in FIG. 9, in the present exemplary embodiment the one side in the Y direction end of the deformable portion 80 and the other side in the Y direction end of the deformable portion 80 respectively configure linear edges 80Y1, 80Y2 extending in straight lines along the X direction. The linear edges 80Y1, 80Y2 configure parts of Y direction connection portions 81 (the Y direction one-side connection portion 81P and the Y direction other-side connection portion 81M may also be simply referred to as the Y direction connection portions 81), and parts of the two arm portions 82A, 82B (or 82C, 82D) branching from the corresponding Y direction connection portion 81. In other words, the linear edges 80Y1, 80Y2 extend in the X direction from the arm portion 82A (or 82C) on the one side in the X direction, straddle the corresponding Y direction connection portion 81, and reach as far as the arm portion 82B (or 82D) on the other side in the X direction. This thereby enables the elastic support body 16 to be disposed efficiently in a space spanning the entire actuator, thereby affording the actuator S1 excellent durability despite its small size.

Moreover, in the present exemplary embodiment, a ratio of an X direction dimension X1 of the deformable portion 80 (namely, a dimension spanning from the finish end 80E on the one side in the X direction to the finish end 80E on the other side in the X direction) to a Y direction dimension Y1 of the deformable portion 80 (X1/Y1) is from 1.0× to 1.5× (specifically from 1.1× to 1.3×). The elastic support body 16 is fixed to the attachment member 12 at the X direction outside of the deformable portion 80. As a result, the actuator S1 is configured with a shape having greater length along the X direction in plan view.

Moreover, the actuator S1 of the present exemplary embodiment is configured with an overall rectangular profile as a result of the profile of the outer frame 20 and the profile of the inner frames 40. The rectangular actuator S1 is therefore less liable to take up unnecessary installation space and enables more efficient placement of the actuator S1 and other components in comparison to, for example, an actuator with a cylindrical profile.

Next, explanation follows regarding the structure and advantageous effects of the elastic support body 16.

Figure 22:
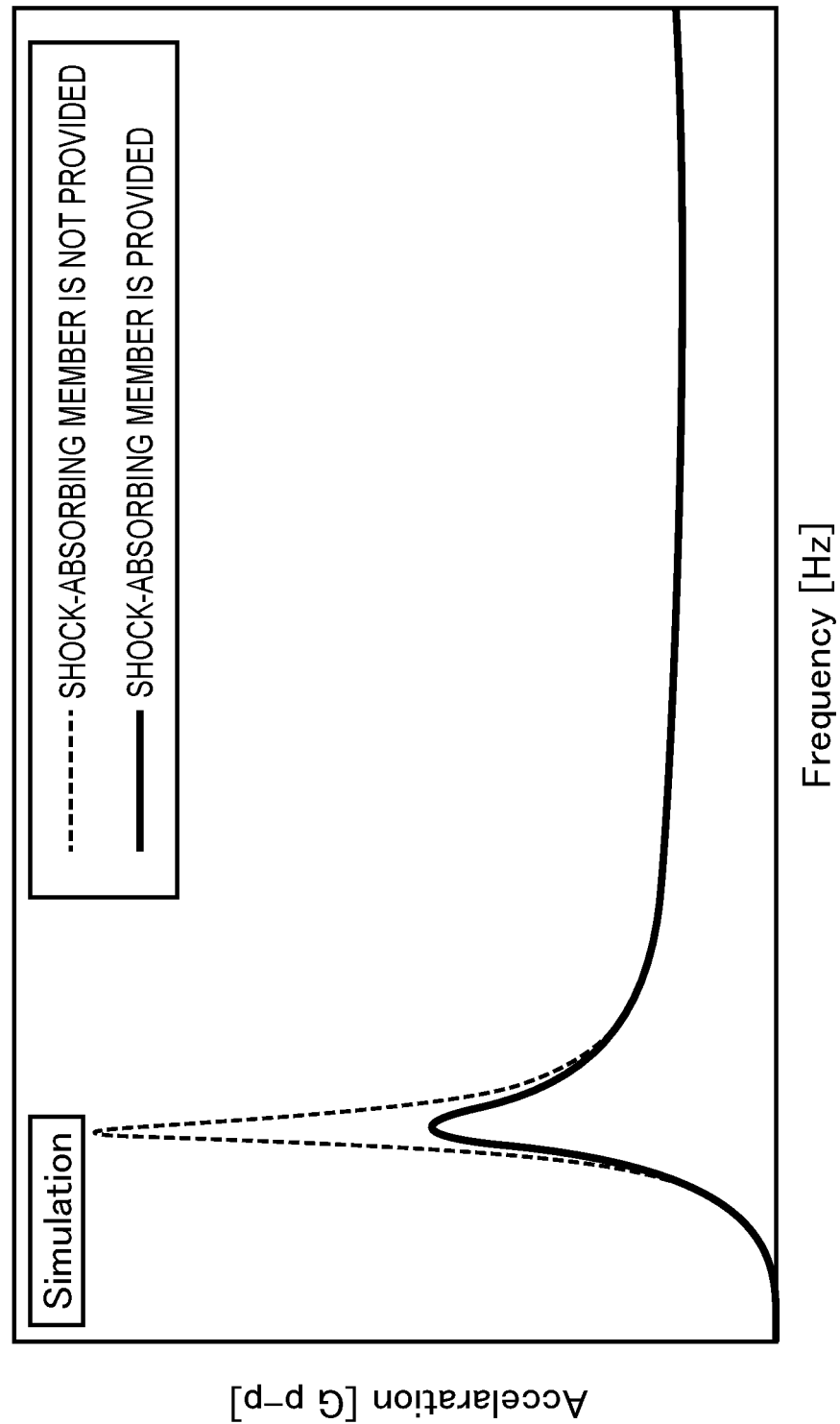
FIG. 22 is a graph illustrating simulation results for a case in which a "shock-absorbing member is not provided" and a case in which a "shock-absorbing member is provided".

FIG. 22 is a graph illustrating simulation results for a relationship between the frequency of vibration imparted to the actuator S1 and acceleration generated in an attachment counterpart by the vibration of the actuator S1 in both a case in which a "shock-absorbing member is not provided" and a case in which a "shock-absorbing member is provided". Note that the case in which the "shock-absorbing member is provided" refers to a structure in which, as in the exemplary embodiment described above, the shock-absorbing member 16L (specifically an adhesive tape) is interposed between the two plate springs 16S. The case in which the "shock-absorbing member is not provided" refers to a case in which the elastic support body is configured by the metal (for example stainless steel) plate springs 16S alone. Note that more precisely, "shock-absorbing member is not provided" corresponds to a case in which the elastic support body is configured by a single plate spring 16S with a plate thickness adjusted so as to have the same spring constant as that of the two plate springs 16S combined in the case in which the "shock-absorbing member is provided".

As can be seen from FIG. 22, the acceleration level when resonance occurs can be suppressed by configuring the elastic support body with a structure in which the shock-absorbing member 16L is disposed between the pair of plate springs 16S.

Figure 23:
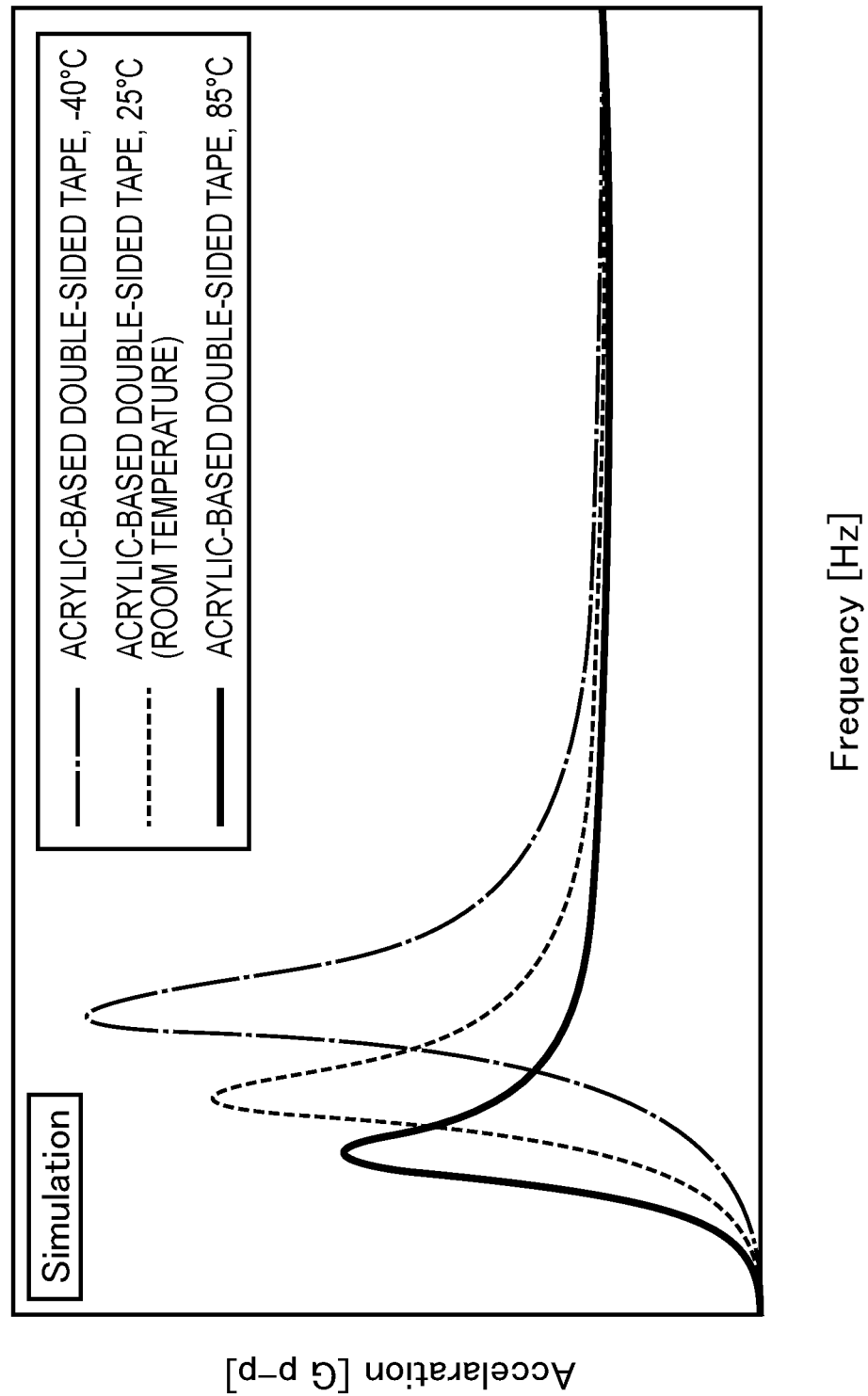
FIG. 23 is a graph illustrating simulation results under different temperature conditions for an elastic support body provided with a structure in which a shock-absorbing member is disposed between a pair of plate springs, in a case in which an acrylic-based adhesive double-sided tape is employed as an adhesive tape serving as a shock-absorbing member.
Figure 24:
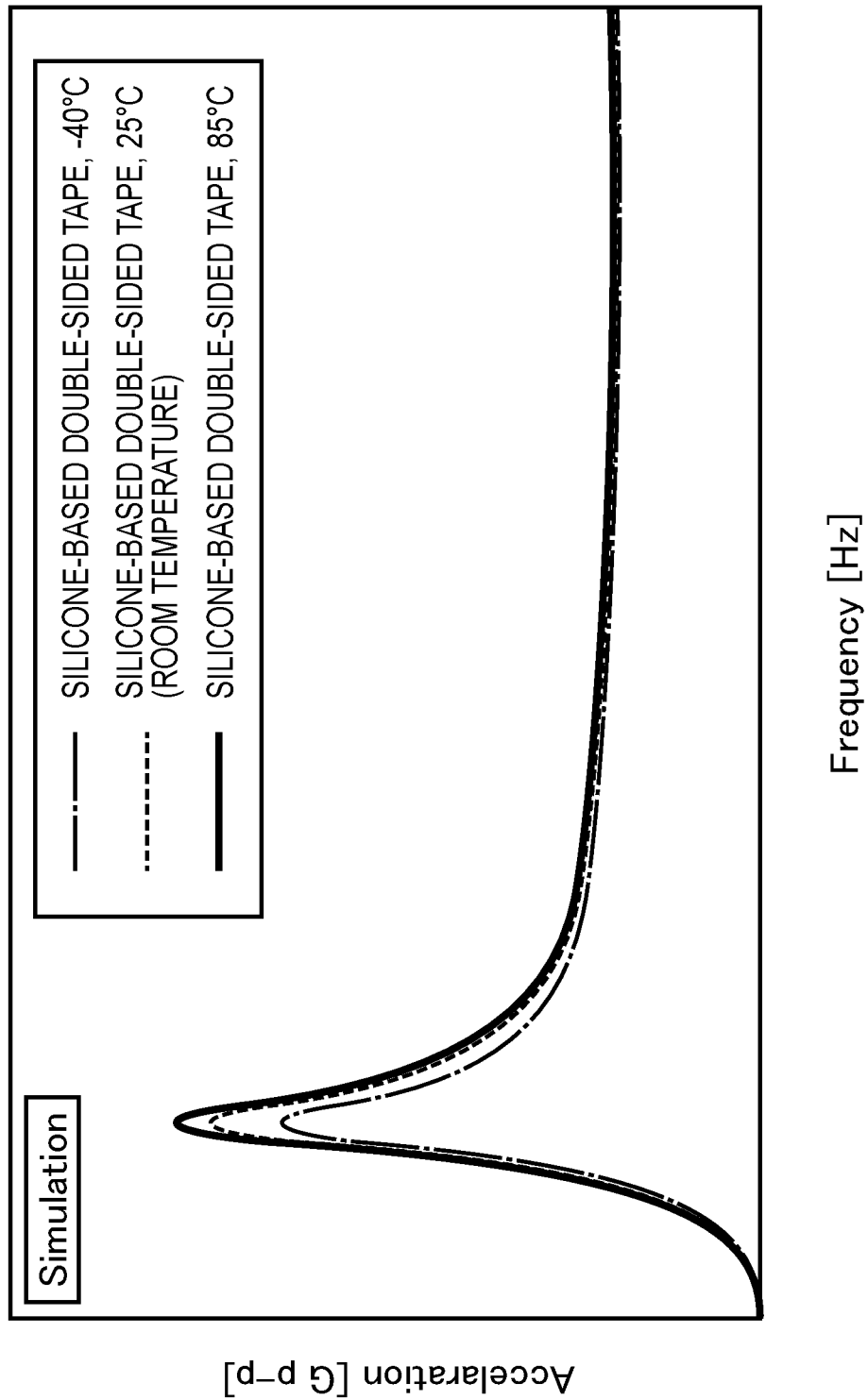
FIG. 24 is a graph illustrating simulation results under different temperature conditions for an elastic support body provided with a structure in which a shock-absorbing member is disposed between a pair of plate springs, in a case in which a silicone-based adhesive double-sided tape is employed as an adhesive tape serving as a shock-absorbing member.

FIG. 23 and FIG. 24 are graphs illustrating simulation results under different temperature conditions for the elastic support body when provided with a structure in which the shock-absorbing member 16L is disposed between the pair of plate springs 16S. FIG. 23 illustrates the results in a case in which an acrylic-based adhesive double-sided tape (specifically a double-sided tape with a triple-layered structure including two acrylic-based adhesive layers on either side of a polyolefin foam layer) is employed as the adhesive tape configuring the shock-absorbing member 16L, and FIG. 24 illustrates the results in a case in which a silicone-based adhesive double-sided tape (specifically a double-sided tape with a triple-layered structure including two silicone-based adhesive layers on either side of a silicone rubber layer) is employed as the adhesive tape configuring the shock-absorbing member 16L.

As these graphs demonstrate, when employing the acrylic-based double-sided tape, the high temperature dependency thereof results in a marked temperature dependency in the vibration characteristics of the elastic support body. On the other hand, when employing the silicone-based adhesive double-sided tape, the low temperature dependency thereof results in an absence of temperature dependency in the vibration characteristics of the elastic support body. It may accordingly be said that employing a silicone-based member as the shock-absorbing member 16L enables the characteristics of the elastic support body 16 to be maintained without being affected by the environmental temperature.

Display Unit 100

Figure 11:
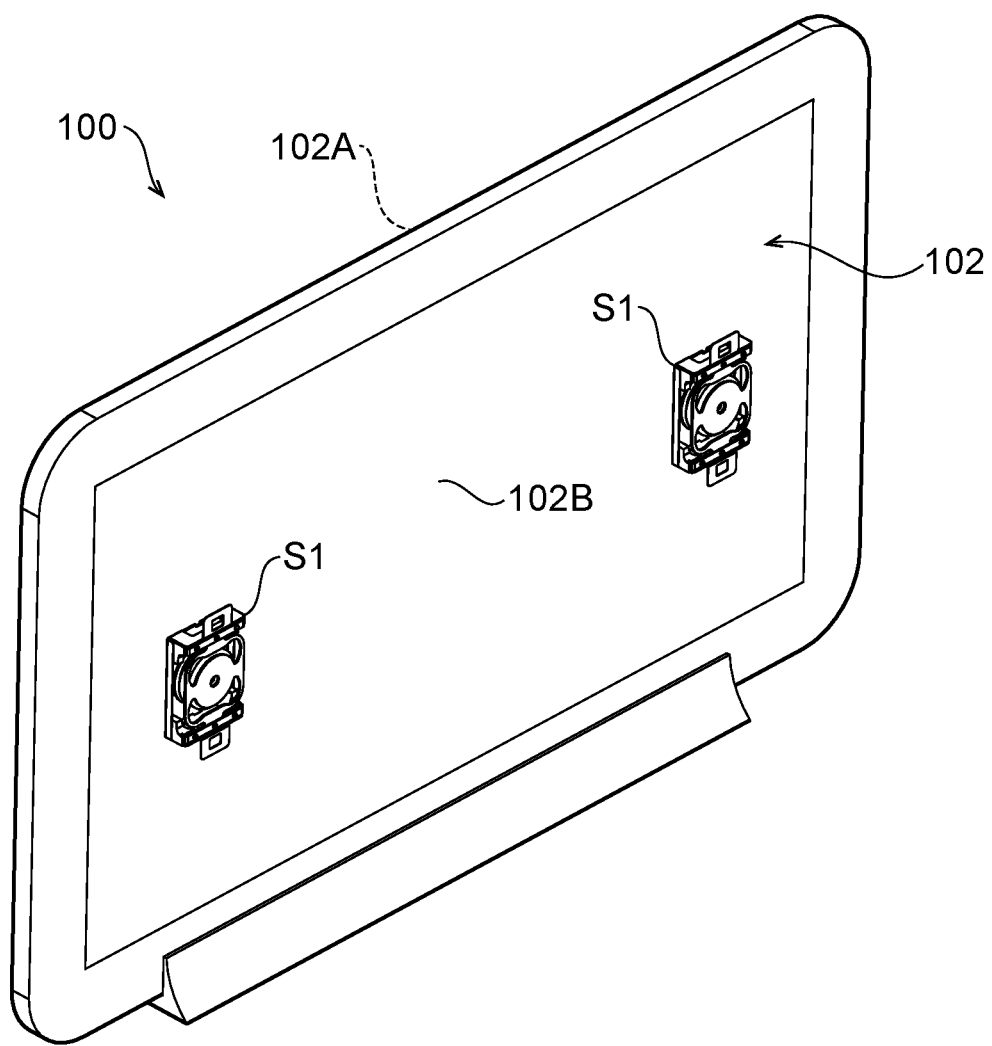
FIG. 11 is a perspective view (illustration as viewed from an oblique rear side) illustrating a display unit provided with an actuator of the first exemplary embodiment.
Figure 12:
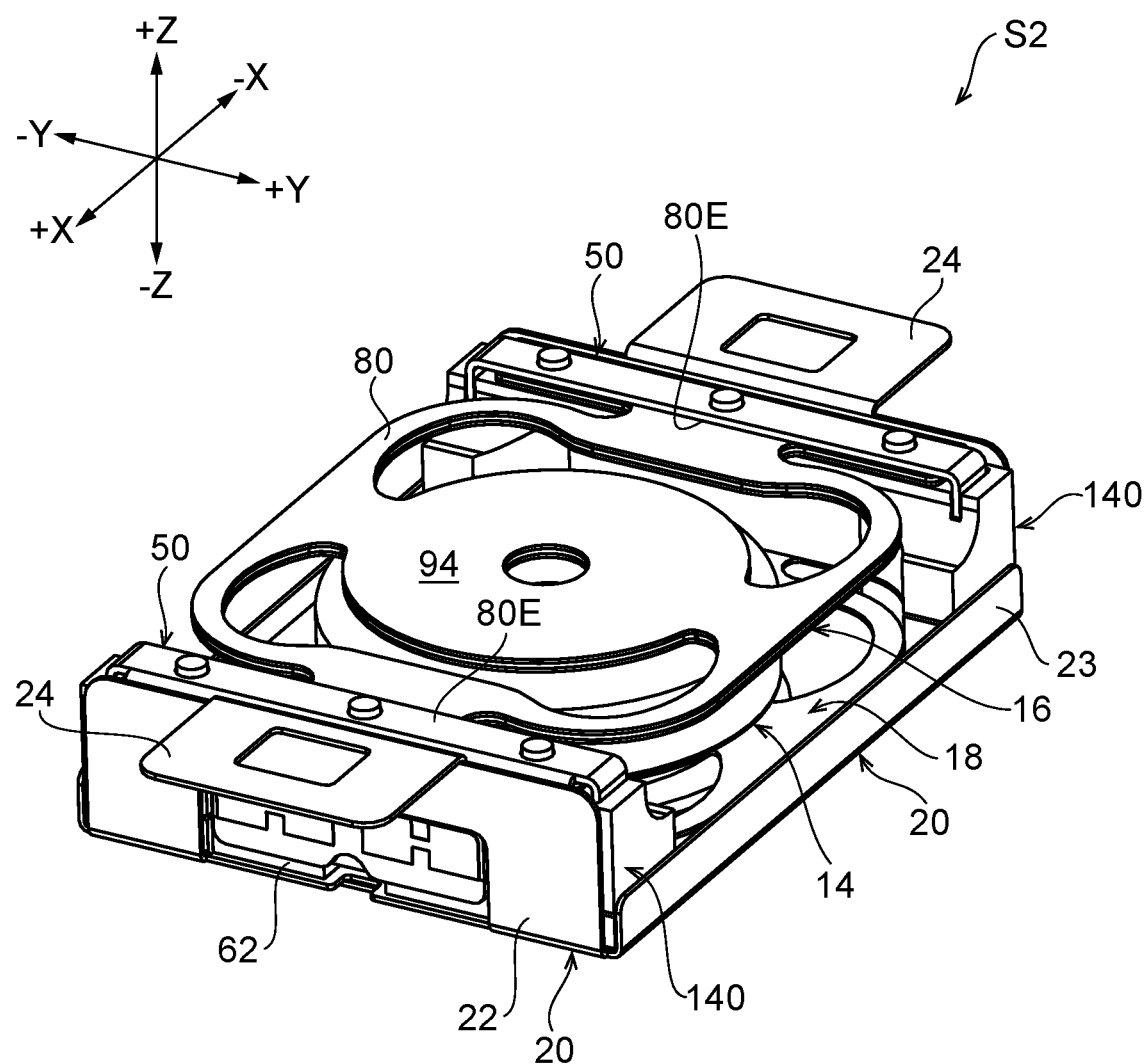
FIG. 12 is a perspective view illustrating an actuator of a second exemplary embodiment.

FIG. 11 illustrates the display unit 100 provided with the actuator S1 of the first exemplary embodiment.

The display unit 100 includes the display section 102, configured by a liquid crystal panel or the like. The display section 102 is configured as a touch panel. The actuator S1 is fixed to a back face 102B of the display section 102. Specifically, the attachment member 12 of the actuator S1 is attached to the back face 102B of the display section 102 using the adhesive sheet 66 of the actuator S1. Note that as illustrated in FIG. 11, plural of the actuators S1 (two in the illustrated example) may be attached to the display section 102.

In the display unit 100 configured in this manner, various sensations can be imparted to a finger of a user touching a front face 102A of the display section 102, namely a touch panel, by controlling the actuator S1. In particular, in the present exemplary embodiment, the small size of the actuator S1 provided to the display unit 100 facilitates the placement of other configurations (other devices, wiring, and the like) also provided to the display unit 100.

Second Exemplary Embodiment

Next, explanation follows regarding an actuator S2 according to a second exemplary embodiment of the present disclosure, with reference to FIG. 12 to FIG. 16.

The actuator S2 of the second exemplary embodiment primarily differs from the actuator S1 of the first exemplary embodiment in the inclusion of an additional elastic support body 18 as well as the elastic support body 16. Configurations having similar structure and functionality to those of other exemplary embodiments are allocated the same reference numerals, and explanation thereof is omitted.

Figure 14:
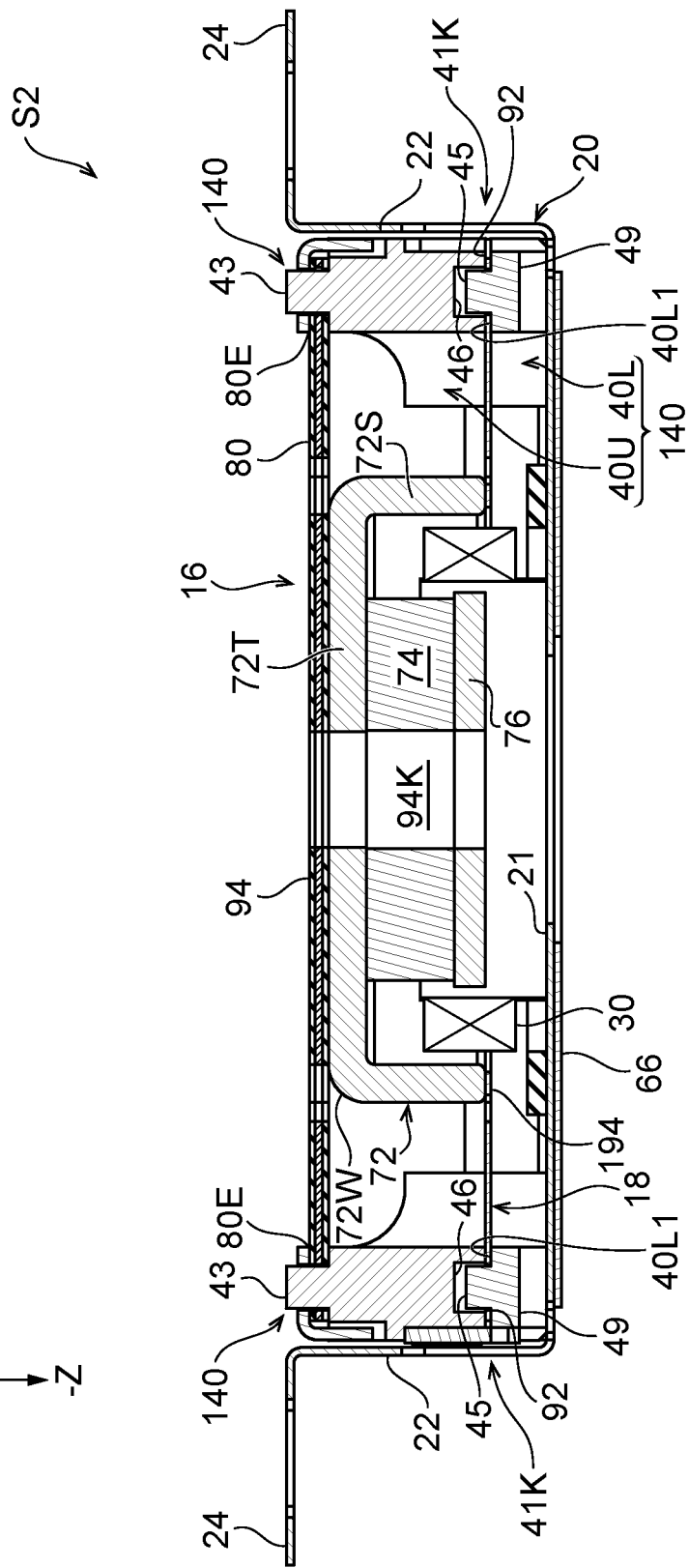
FIG. 14 is a cross-section (sectioned along line 14-14 in FIG. 13) illustrating an actuator of the second exemplary embodiment.

The actuator S2 includes the additional elastic support body 18. The additional elastic support body 18 is a flat plate shaped elastic body with a plate thickness direction aligned with the up-down direction. The additional elastic support body 18 is provided at a lower side of the elastic support body 16. As illustrated in FIG. 14, a movable element-side fixed portion 194 (see FIG. 15) of the additional elastic support body 18 is fixed to a lower end of the downward-extending portion 72S of the yoke 72, and attachment member-side fixed portions 92 of the additional elastic support body 18 are fixed to up-down direction intermediate positions of corresponding upright-standing wall portions 141.

Figure 15:
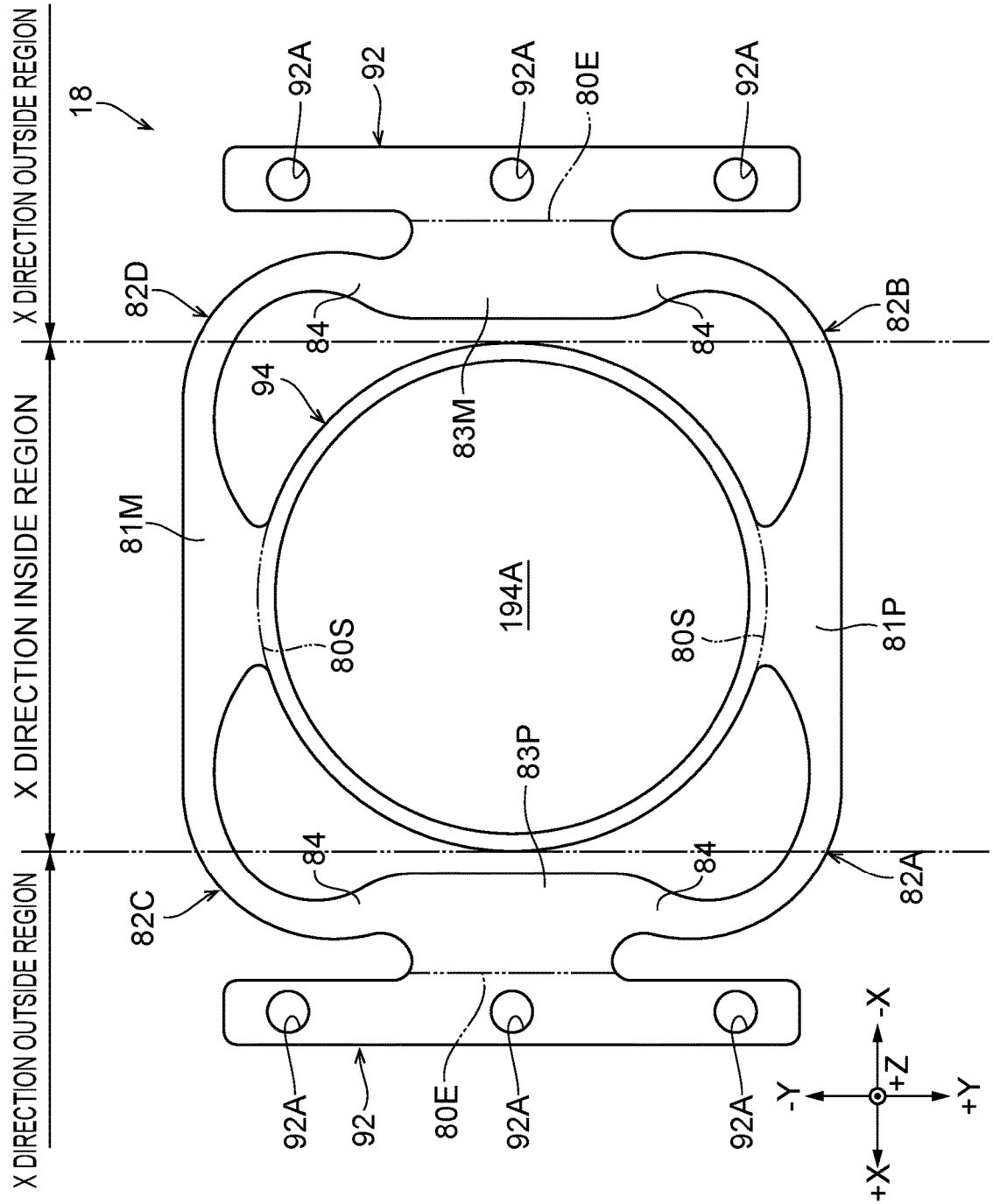
FIG. 15 is a plan view illustrating an additional elastic support body of the second exemplary embodiment.

FIG. 15 is a plan view illustrating the additional elastic support body 18.

In plan view, the additional elastic support body 18 has substantially the same profile as that of the elastic support body 16 (see FIG. 9), but differs significantly at the movable element-side fixed portion 194. Specifically, the movable element-side fixed portion 194 of the additional elastic support body 18 is formed with a through hole 194A that is larger than the reference hole 94K formed in the movable element-side fixed portion 94 of the elastic support body 16. As illustrated in FIG. 14, the coil 30 is disposed at the inside of the through hole 194A.

Figure 16:
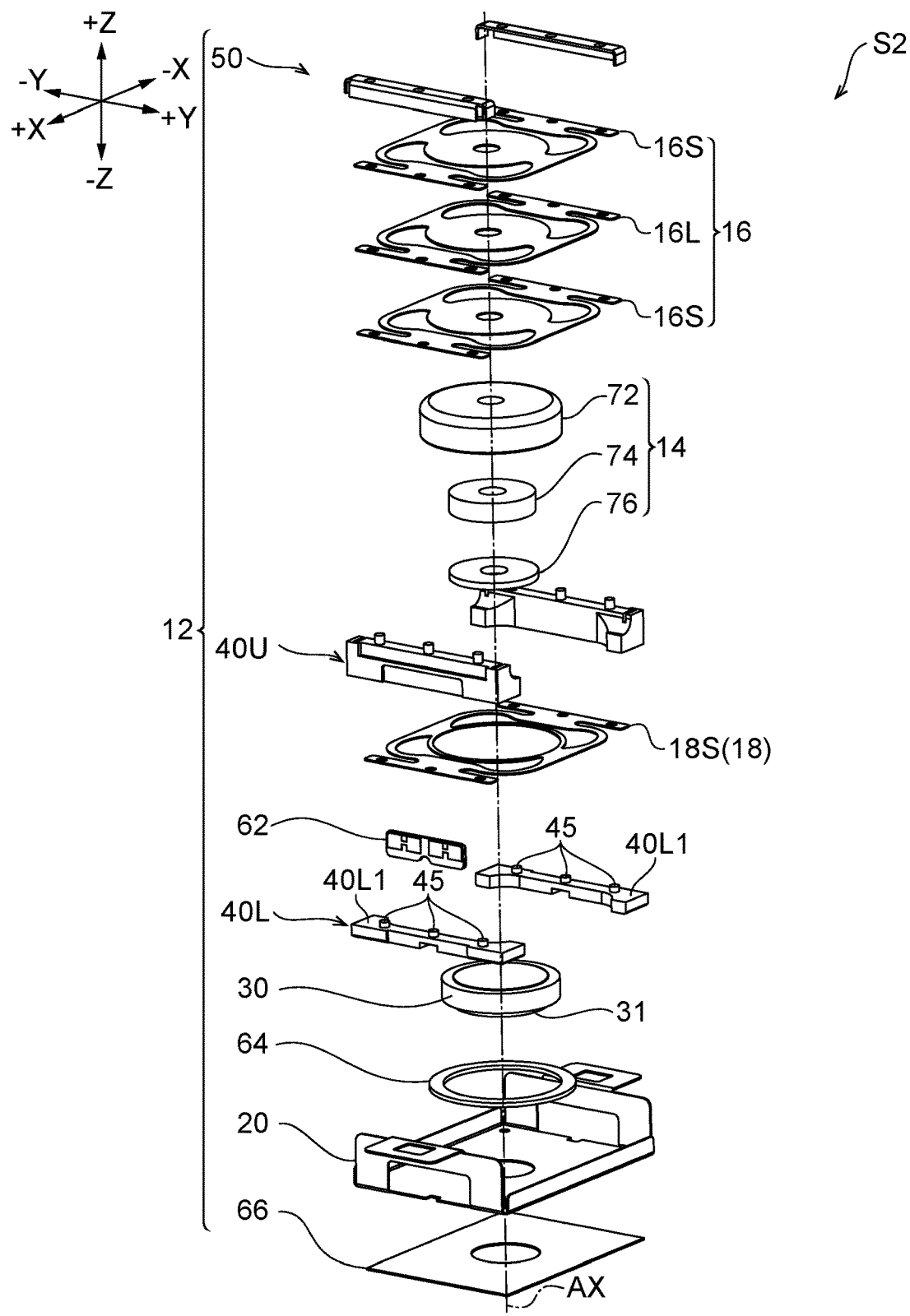
FIG. 16 is an exploded perspective view illustrating an actuator of the second exemplary embodiment.

Upright-standing wall portions 41 of inner frames 140 of the second exemplary embodiment include additional fixing portions 41K for fixing the additional elastic support body 18 at an up-down direction intermediate position thereof. Specifically, unlike the first exemplary embodiment, each of the inner frames 140 is configured by an upper member 40U and a lower member 40L. The additional elastic support body 18 is fixed in a state clamped between the upper member 40U and the lower member 40L. As illustrated in FIG. 16, an upper face 40L1 of each of the lower members 40L is provided with plural pins 45 (three in the present exemplary embodiment) formed in a row along the Y direction. As illustrated in FIG. 14, a lower face of the upper member 40U is formed with cavities 46 corresponding to the plural pins 45. The plural pins 45 are inserted into through holes 92A in the attachment member-side fixed portions 92 of the additional elastic support body 18 and then inserted into the cavities 46 in the upper member 40U.

Each of the lower members 40L is configured including a location configuring part of the corresponding upright-standing wall portion 41 and locations configuring parts of the low wall portions 42. Each of the upper members 40U is also configured including a location configuring part of the corresponding upright-standing wall portion 41 and locations configuring parts of the low wall portions 42.

Figure 13:
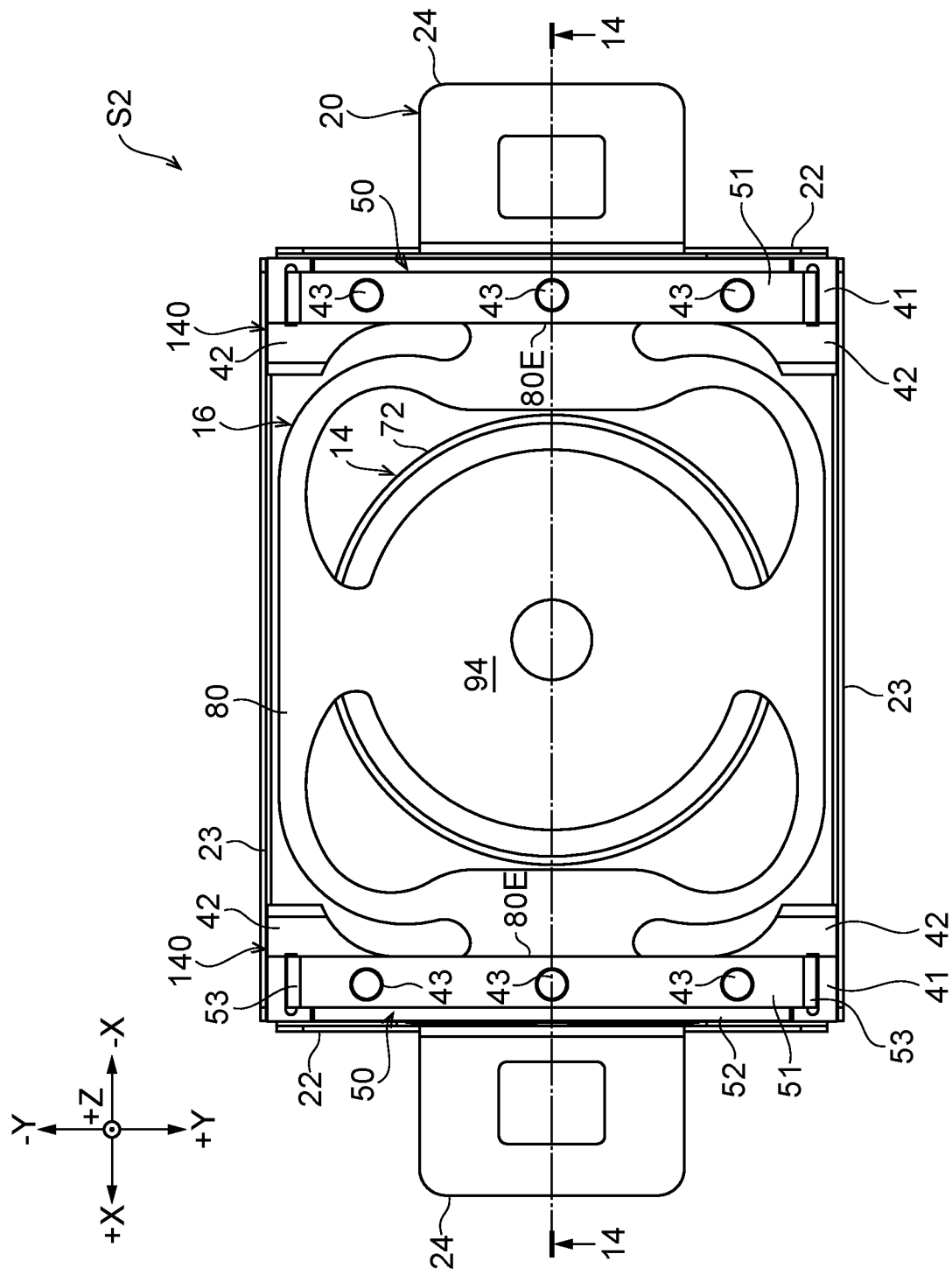
FIG. 13 is a plan view illustrating an actuator of the second exemplary embodiment.

As illustrated in FIG. 13, the low wall portions 42 of the inner frames 140 are disposed at the X direction inside with respect to the upright-standing wall portions 41 ("support body fixing portions"). However, unlike the first exemplary embodiment (see FIG. 4), the low wall portions 42 are not formed as far as positions that coincide with the deformable portion 80 of the elastic support body 16 in plan view. This is in order to prevent interference between arm portions 82A, 82B, 82C, 82D of the additional elastic support body 18 and the low wall portions 42.

Unlike the elastic support body 16, the additional elastic support body 18 is not provided with a shock-absorbing member 16L. Specifically, the additional elastic support body 18 has a single layer structure configured by a plate spring 18S alone.

Operation and Advantageous Effects

Next, explanation follows regarding operation and advantageous effects of the second exemplary embodiment.

In the present exemplary embodiment, the deformable portions 80 of the elastic support bodies (elastic support body 16 and additional elastic support body 18) deform so as to allow the movable element 14 to undergo relative displacement in a predetermined displacement direction (±Z direction) with respect to the attachment member 12.

The finish ends 80E of the deformable portions 80 (attachment member-side fixed portion 92 side ends of the deformable portions 80) are positioned in a region on the one side in the X direction with respect to movable element-side fixed portions 94, 194, and in a region on the other side in the X direction with respect to the movable element-side fixed portions (referred to hereafter as "X direction outside regions"), and are not positioned in a region overlapping the movable element-side fixed portion 94 in the X direction (referred to hereafter as an "X direction inside region").

Accordingly, the present exemplary embodiment enables a reduction in size of the actuator S2.

Moreover, in the present exemplary embodiment, the actuator S2 includes the additional elastic support body 18, thus further stabilizing the displacement (vibration or the like) of the movable element 14.

Moreover, in the present exemplary embodiment, the elastic support body 16 is configured including the shock-absorbing member 16L, and the additional elastic support body 18 is not configured including the shock-absorbing member 16L. This enables good vibration characteristics to be obtained by the elastic support body 16 including the shock-absorbing member 16L. Moreover, the position and orientation of the upper members 40U of the inner frames 140 to which the elastic support body 16 is fixed are more stable than they would be in a configuration in which the additional elastic support body 18 also includes the shock-absorbing member 16L, thus stabilizing the displacement (vibration) of the movable element 14.

Note that the additional elastic support body 18 may be modified to a structure similar to that of the elastic support body 16 so as to include the interposed shock-absorbing member 16L, in which case the vibration damping performance can be enhanced.

Modified Examples of the Elastic Support Body

Note that although the exemplary embodiments described above describe the elastic support body 16 illustrated in FIG. 9 as an example of an "elastic support body", the "elastic support body" of the present disclosure is not limited thereto. Explanation follows regarding specific examples thereof.

In the exemplary embodiments described above, explanation has been given regarding examples in which as illustrated in FIG. 9, the Y direction one-side portion 81P configures the Y direction one-side connection portion 81P that includes the single start end 80S and is connected to both the first arm portion 82A and the second arm portion 82B, and the Y direction other-side portion 81M configures the Y direction other-side connection portion 81M that includes the single start end 80S and is connected to both the third arm portion 82C and the fourth arm portion 82D. However, the "elastic support body" of the present disclosure is not limited thereto. For example, an elastic support body 116, illustrated in FIG. 17, may be provided.

In a deformable portion 180 of this elastic support body 116, the Y direction one-side portion 81P has a two-part split configuration in which the Y direction one-side portion 81P includes two of the start ends 80S. The Y direction other-side portion 81M similarly has a two-part split configuration in which the Y direction other-side portion 81M includes two of the start ends 80S. The Y direction one-side portion 81P therefore does not configure a Y direction one-side connection portion 81P (see FIG. 9), and the Y direction other-side portion 81M does not configure a Y direction other-side connection portion 81M (see FIG. 9).

In the exemplary embodiments described above, explanation has been given regarding examples in which as illustrated in FIG. 9, the X direction one-side portion 83P configures the X direction one-side connection portion 83P that includes a single finish end 80E and is connected to both the first arm portion 82A and the third arm portion 82C, and the X direction other-side portion 83M configures the X direction other-side connection portion 83M that includes a single finish end 80E and is connected to both the second arm portion 82B and the fourth arm portion 82D. However, the "elastic support body" of the present disclosure is not limited thereto. For example, an elastic support body 216, illustrated in FIG. 18, may be provided.

In a deformable portion 280 of this elastic support body 216, the X direction one-side portion 83P has a two-part split configuration in which the X direction one-side portion 83P includes two of the finish ends 80E. The X direction other-side portion 83M similarly has a two-part split configuration in which the X direction other-side portion 83M includes two of the finish ends 80E. The X direction one-side portion 83P therefore does not configure an X direction one-side connection portion 83P (see FIG. 9), and the X direction other-side portion 83M does not configure an X direction other-side connection portion 83M (see FIG. 9).

Figure 19:
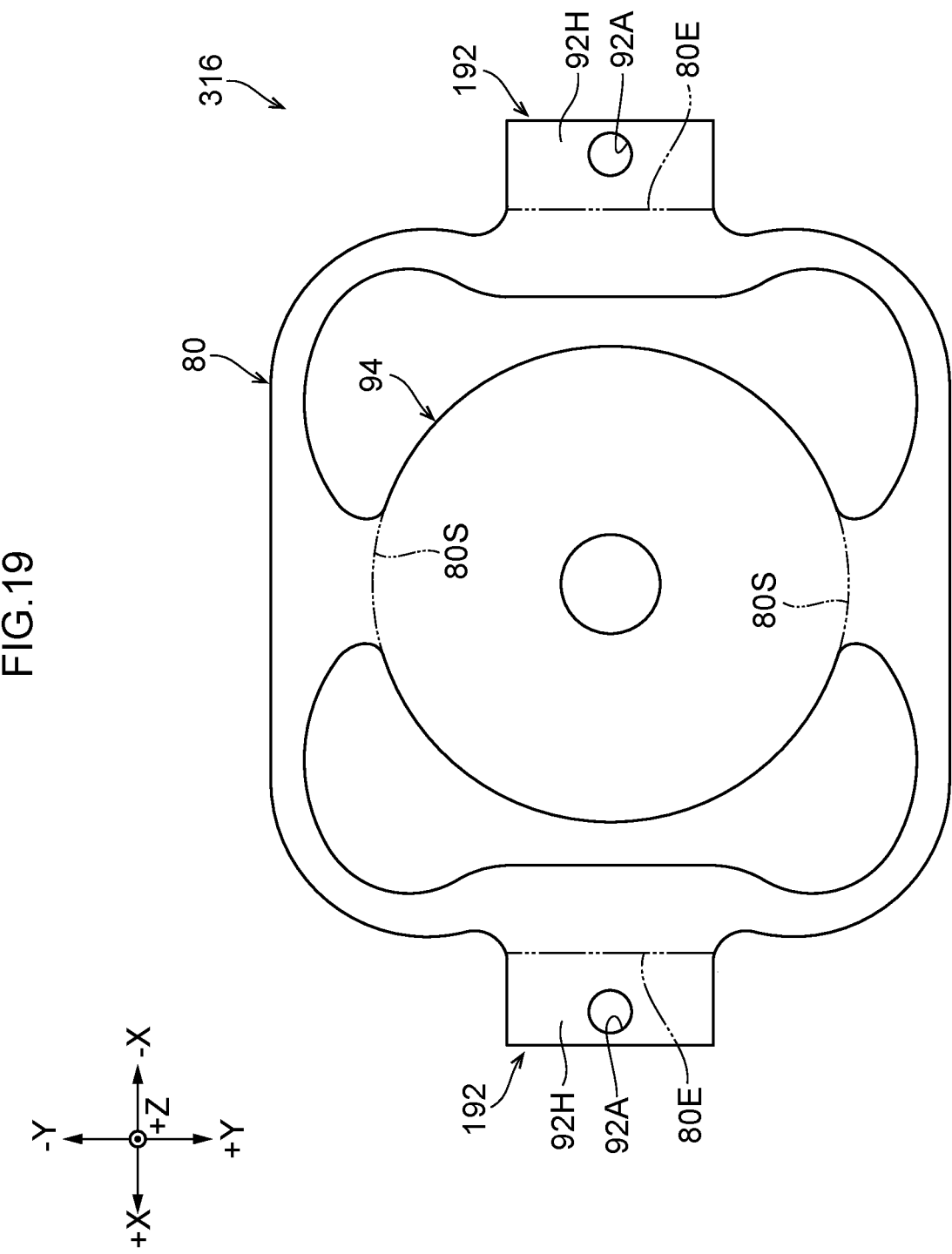
FIG. 19 is a plan view illustrating a modified example of an elastic support body.

In the exemplary embodiments described above, explanation has been given regarding examples in which as illustrated in FIG. 9, the Y direction length of the attachment member-side fixed portions 92 extends further toward both Y direction sides than the Y direction length of the finish ends 80E. However, an "attachment member-side fixed portion" of the present disclosure is not limited thereto. For example, an elastic support body 316 may be provided with an attachment member-side fixed portion 192 illustrated in FIG. 19.

The attachment member-side fixed portion 192 of the elastic support body 316 is configured by only the bodies 92H provided at positions aligned with the Y direction positions of the boundary portions 80E. The extension portions 92E (see FIG. 9) positioned at the Y direction outsides of the body 92H are not provided.

In the exemplary embodiment described above, as illustrated in FIG. 9, explanation has been given regarding examples in which each of the four arm portions 82A, 82B, 82C, 82D is configured including the return portion 84 extending in a direction toward the Y direction inside and the X direction inside. However, an "arm portion" of the present disclosure is not limited thereto. For example, an elastic support body 416, illustrated in FIG. 20, may be provided with arm portions 482A, 482B, 482C, 482D.

The arm portions 482A, 482B, 482C, 482D of a deformable portion 480 of the elastic support body 416 are not provided with the return portions 84 extending in a direction toward the Y direction inside and the X direction inside.

Explanation has been given regarding examples in which the respective arm portions 82A, 82B, 82C, 82D are each configured by a single arm. However, an "arm portion" of the present disclosure is not limited thereto. For example, although not illustrated in the drawings, each of the respective arm portions 82A, 82B, 82C, 82D may be configured by two or more arms.

Supplementary Explanation

Note that in the exemplary embodiments described above, explanation has been given regarding examples in which a "coil" is configured by the coil 30 that has a circular profile in plan view. However, the "coil" of the present disclosure is not limited thereto, and may have another profile, for example a rectangular or other polygonal profile in plan view.

Moreover, in the exemplary embodiments described above, explanation has been given regarding examples in which the one-side inner frame 40 and the other-side inner frame 40 are configured by separate components. However, the one-side inner frame 40 and the other-side inner frame 40 may be integrated together. Specifically, the low wall portions 42 of the one-side inner frame 40 and the low wall portions 42 of the other-side inner frame 40 may be extended toward the X direction inside so as to connect together. Connecting together the low wall portions 42 opposing each other in the X direction to integrate the respective inner frames 40 into a single unit improves the ease of handling of the frame during assembly, and also enables collapse prevention functionality to be enhanced.

Moreover, in the exemplary embodiments described above, explanation has been given regarding examples in which the outer frame 20 is manufactured from a metal sheet, and is formed as a separate component to the resin inner frames 40. However, the present disclosure is not limited thereto. For example, the outer frame 20 may be manufactured from resin. Furthermore, in such cases, the outer frame 20 and the inner frames 40 may be integrally formed by resin molding.

Moreover, in the exemplary embodiments described above, explanation has been given regarding examples in which the actuator S1 is attached to the display section 102 of the display unit 100. However, there is no particular limitation to the locations or devices to which the actuator S1 is attached.

The disclosure of Japanese Patent Application No. 2019-047331 is incorporated in its entirety by reference herein.

EXPLANATION OF THE REFERENCE NUMERALS

S1, S2 actuator
12 attachment member
14 movable element
16, 116, 216, 316, 416 elastic support body
20 outer frame
21 base plate (coil fixing portion)
30 coil
40 inner frames
41 upright-standing wall portion (support body fixing portion)
42 low wall portion (collapse prevention portion)
74 magnet
80, 180, 280, 480 deformable portion
80S start end
80E finish end
81P Y direction one-side connection portion (Y direction one-side portion)
81M Y direction other-side connection portion (Y direction other-side portion)
82A, 482A first arm portion
82B, 482B second arm portion
82C, 482C third arm portion
82D, 482D fourth arm portion
83P X direction one-side connection portion (X direction one-side portion)
83M X direction other-side connection portion (X direction other-side portion)
84 return portion
92, 192 attachment member-side fixed portions
92H body
92E extension portions
94, 194 movable element-side fixed portion
100 display unit

The invention claimed is:

1. An actuator comprising:
an attachment member including a coil;
a movable element including a magnet and configured to undergo relative displacement in a predetermined displacement direction with respect to the attachment member; and
an elastic support body including attachment member-side fixed portions fixed to the attachment member, a movable element-side fixed portion, the movable element-side fixed portion fixed to the movable element, and a deformable portion positioned between the attachment member-side fixed portions and the movable element-side fixed portion, wherein:
in a case in which:
a ±Z direction is defined as the displacement direction and an X direction and a Y direction are defined as mutually perpendicular directions in a flat plane orthogonal to the ±Z direction, and
a start end is defined as an end of the deformable portion on the movable element-side fixed portion and a finish end is defined as an end of the deformable portion on an attachment member-side fixed portion of the attachment member-side fixed portions,
the deformable portion having a plurality of finish ends, wherein one of the finish ends of the deformable portion is positioned in a region on one side in the X direction with respect to the movable element-side fixed portion and another one of the finish ends is positioned in a region on another side in the X direction with respect to the movable element-side fixed portion, and not positioned in a region overlapping with the movable element-side fixed portion in the X direction; and
the attachment member-side fixed portions are respectively positioned in the region on the one side in the X direction with respect to the movable element-side fixed portion and in the region on the another side in the X direction with respect to the movable element-side fixed portion, and not positioned in the region overlapping with the movable element-side fixed portion in the X direction.

2. The actuator of claim 1, wherein the deformable portion includes a plurality of start end and the deformable portion includes:
a Y direction one-side portion that includes one of the start ends and is formed on one side in the Y direction with respect to the movable element-side fixed portion;
a Y direction other-side portion that includes another of the start ends and is formed on another side in the Y direction with respect to the movable element-side fixed portion;
an X direction one-side portion that includes the one of the finish ends and is formed on the one side in the X direction with respect to the movable element-side fixed portion;
an X direction another-side portion that includes the another of the finish ends and is formed on the other side in the X direction with respect to the movable element-side fixed portion;
a first arm portion joining the Y direction one-side portion and the X direction one-side portion together;
a second arm portion joining the Y direction one-side portion and the X direction other-side portion together;
a third arm portion joining the Y direction other-side portion and the X direction one-side portion together; and
a fourth arm portion joining the Y direction other-side portion and the X direction other-side portion together.

3. The actuator of claim 2, wherein:
the Y direction one-side portion configures a Y direction one-side connection portion that includes a single start end and that is connected to both the first arm portion and the second arm portion; and
the Y direction other-side portion configures a Y direction other-side connection portion that includes a single start end and that is connected to both the third arm portion and the fourth arm portion.

4. The actuator of claim 2, wherein:
the X direction one-side portion configures an X direction one-side connection portion that includes a single finish end and that is connected to both the first arm portion and the third arm portion; and
the X direction another-side portion configures an X direction other-side connection portion that includes a single finish end and that is connected to both the second arm portion and the fourth arm portion.

5. The actuator of claim 2, wherein:
the Y direction one-side portion configures a Y direction one-side connection portion that includes a single start end and that is connected to both the first arm portion and the second arm portion;
the Y direction other-side portion configures a Y direction other-side connection portion that includes a single start end and that is connected to both the third arm portion and the fourth arm portion;
the X direction one-side portion configures an X direction one-side connection portion that includes a single finish end and that is connected to both the first arm portion and the third arm portion; and
the X direction another-side portion configures an X direction other-side connection portion that includes a single finish end and that is connected to both the second arm portion and the fourth arm portion.

6. The actuator of claim 2, wherein, in a case in which each of the four arm portions is considered as a location extending from a start end side toward a finish end side, each of the four arm portions is configured including a return portion having an extension direction toward a Y direction inside and toward an X direction inside.

7. The actuator of claim 1, wherein a Y direction one-side end and a Y direction other-side end of the attachment member-side fixed portion are positioned further toward a Y direction outside the finish end.

8. The actuator of claim 1, wherein:
the attachment member is configured including:
a coil fixing portion to which the coil is fixed, and
a support body fixing portion to which the elastic support body is fixed;
the coil fixing portion is a flat plate shaped portion with a plate thickness direction aligned with the ±Z direction;
the coil is fixed to one side in the Z direction of the coil fixing portion;
the support body fixing portion is provided on the one side in the Z direction with respect to the coil fixing portion such that the elastic support body is disposed on the one side in the Z direction with respect to the coil fixing portion; and the movable element is disposed on the one side in the Z direction with respect to the coil fixing portion and is fixed to a Z direction other-side of the elastic support body.

9. The actuator of claim 8, wherein:

a pair of support body fixing portions are provided on the one side in the X direction and the another side in the X direction with respect to the movable element, respectively; and the actuator further comprises a collapse prevention portion to prevent the pair of support body fixing portions from collapsing toward an X direction inside.

10. The actuator of claim 1, wherein the elastic support body has a structure in which a shock-absorbing member is disposed between a pair of plate springs.

11. A display unit comprising the actuator of claim 1.

* * * * *